United States Patent

Yasue et al.

[11] Patent Number: 5,879,268
[45] Date of Patent: Mar. 9, 1999

[54] APPARATUS FOR AUTOMATIC TRANSMISSION SHIFTING ACTION HAVING DEVICE FOR LEARNING COMPENSATION OF CONTROL PARAMETER INFLUENCING PATTERN OF PRESSURE CHANGE OF FRICTIONAL COUPLING DEVICE

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 884,038

[22] Filed: Jun. 27, 1997

[30] Foreign Application Priority Data

Jun. 28, 1996 [JP] Japan .................................. 8-169664

[51] Int. Cl.$^6$ ................................................. F16H 61/04
[52] U.S. Cl. ....................... 477/143; 477/154; 477/156; 701/66
[58] Field of Search .................................. 477/156, 158, 477/143, 154, 155, 121; 701/58, 59, 66

[56] References Cited

U.S. PATENT DOCUMENTS

| 5,079,971 | 1/1992 | Yoshimura et al. ................. 701/66 X |
| 5,393,275 | 2/1995 | Okada et al. ......................... 701/66 X |
| 5,643,135 | 7/1997 | Tabata et al. ............................ 477/154 |
| 5,669,849 | 9/1997 | Tabata et al. ....................... 477/154 X |
| 5,725,454 | 3/1998 | Yasue et al. ............................ 477/155 |
| 5,776,030 | 7/1998 | Minowa et al. .................... 477/158 X |
| 5,779,594 | 7/1998 | Minowa et al. ......................... 477/156 |
| 5,792,021 | 8/1998 | Minowa et al. .................... 477/156 X |

*Primary Examiner*—Dirk Wright
*Assistant Examiner*—Peter T. Kwon
*Attorney, Agent, or Firm*—Oblon, Spivak, McClelland, Maier, & Neustadt, P.C.

[57] ABSTRACT

An apparatus for controlling the pressure of a hydraulically operated frictional coupling device which is released or engaged to achieve a shifting action of an automatic transmission, by first rapidly reducing or increasing the pressure to a predetermined level, holding the pressure at this level for a predetermined time and then continuously reducing or increasing the pressure to complete the shifting action. A learning compensation device is provided to update, by learning compensation, a selected control parameter influencing a pattern of change of the pressure of the coupling device during the shifting action such that the shifting action is achieved in a predetermined manner.

6 Claims, 17 Drawing Sheets

FIG. 2

| SHIFT LEVER | TRANSMISSION POSITIONS | $C_1$ | $C_2$ | $C_3$ | $B_1$ | $B_2$ | $B_3$ | $F_1$ | $F_2$ |
|---|---|---|---|---|---|---|---|---|---|
| P | | | | | | | ○ | | |
| R | | | ○ | | | ○ | ○ | | |
| N | | | | | | | ○ | | |
| D | 1st | ○ | | | | | ○ | △ | △ |
| D | 2nd | ○ | | | ○ | | ○ | | △ |
| D | 3rd | ○ | ○ | | | | ○ | | △ |
| D | 4th | ○ | ○ | ○ | | | | | |
| 2 | 1st | ○ | | | | | ○ | △ | △ |
| 2 | 2nd | ○ | | | ○ | | ○ | | △ |
| L | 1st | ○ | | | | ○ | ○ | △ | △ |

APPARATUS FOR AUTOMATIC TRANSMISSION SHIFTING ACTION HAVING DEVICE FOR LEARNING COMPENSATION OF CONTROL PARAMETER INFLUENCING PATTERN OF PRESSURE CHANGE OF FRICTIONAL COUPLING DEVICE

CROSS REFERENCE TO RELATED APPLICATIONS

Patent Application claiming priority of Japanese Patent Application No. 8-147747 filed Jun. 11, 1996.

BACKGROUND OF THE INVENTION

1. Field of the Invention

The present invention relates in general to an apparatus for controlling an automatic transmission of a motor vehicle, and more particularly to techniques for controlling a hydraulically operated frictional coupling device during a shifting action of the automatic transmission.

2. Discussion of the Related Art

There is known an automatic transmission for motor vehicle, which is adapted to effect a shift-up action by releasing a one-way clutch while engaging a certain hydraulically operated frictional coupling device, or by releasing the frictional coupling device while engaging another hydraulically operated frictional coupling device. This type of automatic transmission tends to suffer from a shifting shock upon such a shift-up action during acceleration of the vehicle with an accelerator pedal being depressed. Thus, there has been a need to minimize such a shifting shock of the automatic transmission.

For controlling an automatic transmission with a reduced shifting shock, there is proposed an apparatus for controlling the pressure of a hydraulically operated frictional coupling device which is released to achieve a given shifting action of the automatic transmission. This control apparatus is adapted to first rapidly reduce the pressure of the frictional coupling device to a predetermined level, and then continuously reduce the pressure at a relatively low rate so that the input speed of the automatic transmission coincides with a target value. An example of such a known automatic transmission control apparatus is disclosed in JP-A-63-397849.

In controlling the pressure of the frictional coupling device during a shifting action of the automatic transmission, the known control apparatus does not take into account factors other than the input shaft of the automatic transmission, which factors influence the behavior of the automatic transmission during the shifting action. Such factors include the temperature of the working fluid for operating the frictional coupling device, and the chronological change of the operating or engaging characteristic of the coupling device. The automatic transmission controlled by the known control apparatus tends to suffer from a shifting shock or an overshoot (temporary rise) of the engine speed, particularly when the automatic transmission is shifted up during acceleration of the motor vehicle with the accelerator pedal placed in a depressed state. Thus, the known control apparatus is not satisfactory to assure sufficient stability or smoothness of the shifting action of the automatic transmission.

SUMMARY OF THE INVENTION

It is therefore an object of this invention to provide an apparatus for controlling an automatic transmission of a motor vehicle, which permits a shift-up action of the automatic transmission to be achieved in a satisfactory manner during acceleration of the vehicle.

The above object may be achieved according to a first aspect of the present invention, which provides an apparatus for controlling an automatic transmission of a motor vehicle, wherein a shifting action of the automatic transmission is achieved by releasing one of two hydraulically operated frictional coupling devices while at the same time engaging the other of the frictional coupling devices, the apparatus comprising: (a) rapid pressure reduction means for rapidly reducing a pressure of the above-indicated one of the two hydraulically operated frictional coupling devices, upon determination that the shifting action of the automatic transmission should be achieved; (b) releasing pressure hold means for holding the pressure of the above-indicated one of the two frictional coupling devices at a predetermined pressure level for a predetermined hold time; (c) continuous pressure reduction means for continuously reducing the pressure of the above-indicated one frictional coupling device at a predetermined reduction rate upon expiration of the predetermined hold time; and (d) learning compensation means for updating, by learning compensation, a control parameter which influences a pattern of change of the pressure of the above-indicated one frictional coupling device during the shifting action, such that said shifting action is achieved in a predetermined manner.

In the present control apparatus for controlling the automatic transmission, the learning compensation means is adapted to update or adjust the selected control parameter influencing the pattern of change of the pressure of the appropriate frictional coupling device, so that the shifting action is achieved in the predetermined manner. The shifting action is a so-called "clutch-to-clutch shifting action" wherein the two hydraulically operated frictional coupling devices are simultaneously released and engaged, respectively. The learning compensation of the selected control parameter is effective to permit the pressure of the above-indicated one frictional coupling device to be controlled in the desired pattern, irrespective of a variation in the temperature of the working fluid which is discharged from the above-indicated one frictional coupling device and supplied to the other frictional coupling device. Accordingly, the present control apparatus assures sufficient stability or smoothness of the shifting action of the automatic transmission, without a considerable shifting shock or a considerable overshoot of the speed of an engine of the motor vehicle.

In one form of the present first aspect of the invention, the apparatus is adapted to control a shift-up action of the automatic transmission during acceleration of the motor vehicle wherein a drive force is transmitted in a direction from an engine to a drive wheel of the motor vehicle.

According to one advantageous arrangement of the above form of the invention, the predetermined pressure level to which the pressure of the above-indicated one frictional coupling device is rapidly reduced by the rapid pressure reduction means is determined to be higher than a critical level at which the above-indicated one frictional coupling device starts slipping.

According to another advantageous arrangement of the same form of the invention, the releasing pressure hold means determines the predetermined hold time such that a piston of the other frictional coupling device is permitted to be moved during the predetermined hold time, to a position at which a frictional coupling action of the other frictional coupling device is initiated.

According to a further advantageous arrangement of the above form of the invention, the apparatus further comprises shift-up action initiation monitoring means for determining whether the shift-up action of the automatic transmission has been substantially initiated, and fully releasing means for fully releasing the above-indicated one frictional coupling device with the pressure thereof being reduced to an atmospheric pressure, when the shift-up action initiation monitoring means determines that the shift-up action has been substantially initiated.

In a second preferred form of the first aspect of this invention, the apparatus further comprises fast filling means for effecting fast filling of the above-indicated other frictional coupling device with a working fluid.

According to one advantageous arrangement of the above second preferred form of the invention, the apparatus further comprises engaging pressure hold means operated after the fast filling of the above-indicated other frictional coupling device, for increasing a pressure of the other frictional coupling device at a predetermined hold level and holding the pressure at the predetermined hold level.

Where the shifting action of the automatic transmission is the shift-up action during acceleration of the motor vehicle as described above, the apparatus according to the second preferred form of the invention may further comprise: shift-up action initiation monitoring means for determining whether the shift-up action of the automatic transmission has been substantially initiated; and continuous pressure increase means for continuously increasing the pressure of the other frictional coupling device from the predetermined hold level at a predetermined rate, when the shift-up action initiation monitoring means determines that the shift-up action has been substantially initiated. In this case, the apparatus may further comprise: shift-up action completion monitoring means for determining whether the shift-up action of the automatic transmission is completed; and final pressure increase means for increasing the pressure of the other frictional coupling device to a maximum value thereof when the shift-up action completion monitoring means determines that the shift-up action is completed.

In a third preferred form of the apparatus of the present invention, the learning compensation means updates the control parameter such that a time duration during which the shifting action of the automatic transmission is effected coincides with a predetermined target value.

In a fourth preferred form of the apparatus, the learning compensation means updates, as the control parameter, the predetermined hold time for which the pressure of the above-indicated one frictional coupling device is held at the predetermined level by the releasing pressure hold means.

In a fifth preferred form of the apparatus, the learning compensation means updates, as the control parameter, the predetermined reduction rate at which the pressure of the above-indicated one frictional coupling device is continuously reduced by the continuous pressure reduction means.

In a sixth preferred form of the apparatus, the learning compensation means updates, as the control parameter, the predetermine pressure level at which the pressure of the above-indicated one frictional coupling device is rapidly reduced by the rapid pressure reduction means.

In a seventh preferred form of the first aspect of the invention, the apparatus further comprises rapid pressure reduction amount determining means for determining the pressure level to which the pressure of the above-indicated one frictional coupling device is rapidly reduced by the rapid pressure reduction means. The rapid pressure reduction amount determining means determines the pressure level on the basis of an input torque of the automatic transmission. For instance, the pressure level is determined such that the pressure level is higher by a predetermined amount than a critical level at which the above-indicated frictional coupling device starts slipping at the input torque of the automatic transmission.

The object indicated above may also be achieved according to a second aspect of this invention, which provides an apparatus for controlling an automatic transmission operatively connected to an engine of a motor vehicle, wherein a shifting action of the automatic transmission is achieved by releasing one of two hydraulically operated frictional coupling devices while at the same time engaging the other of the frictional coupling devices, the apparatus comprising: (a) rapid pressure reduction means for rapidly reducing a pressure of the above-indicated one of the two hydraulically operated frictional coupling devices to a predetermined pressure level, upon determination that the shifting action of the automatic transmission should be achieved; (b) releasing pressure hold means for holding the pressure of the above-indicated one of the two frictional coupling devices at the predetermined pressure level for a predetermined hold time; (c) continuous pressure reduction means for continuously reducing the pressure of the above-indicated one frictional coupling device at a predetermined reduction rate upon expiration of the predetermined hold time; (d) engine overshoot detecting means for detecting an overshoot of the engine due to an insufficient amount of simultaneous partial engagements of the two frictional coupling devices during the shifting action of the automatic transmission; and (e) learning compensation means for updating, by learning compensation, a control parameter which influences a pattern of change of the pressure of the above-indicated one frictional coupling device during the shifting action, such that an amount of the overshoot of the engine is held within a predetermined range.

In the present control apparatus according to the second aspect of this invention, the learning compensation means is arranged to update the selected control parameter influencing the pattern of change of the pressure of the above-indicated one frictional coupling device such that the amount of overshoot of the engine speed detected by the engine overshoot detecting means is held within the predetermined range. The present learning compensation of the control parameter is effective to permit the pressure of the above-indicated one frictional coupling device to be controlled in the desired pattern during the shifting action of the automatic transmission, irrespective of the chronological change in the operating characteristics of the two frictional coupling devices, and the temperature variation of the working fluid used for operating the frictional coupling devices. Accordingly, the present control apparatus also assures sufficient stability or smoothness of the shifting action of the automatic transmission without a considerable shifting shock or a considerable overshoot of the engine speed.

In one form of the present second aspect of the invention, the apparatus is adapted to control a shift-up action of the automatic transmission during acceleration of the motor vehicle wherein a drive force is transmitted in a direction from an engine to a drive wheel of the motor vehicle.

According to one advantageous arrangement of the above form of the invention, the predetermined pressure level to which the pressure of the above-indicated one frictional coupling device is rapidly reduced by the rapid pressure reduction means is determined to be higher than a critical level at which the above-indicated one frictional coupling device starts slipping.

According to another advantageous arrangement of the same form of the invention, the releasing pressure hold means determines the predetermined hold time such that a piston of the other frictional coupling device is permitted to be moved during the predetermined hold time, to a position at which a frictional coupling action of the other frictional coupling device is initiated.

According to a further advantageous arrangement of the above form of the invention, the apparatus further comprises shift-up action initiation monitoring means for determining whether the shift-up action of the automatic transmission has been substantially initiated, and fully releasing means for fully releasing the above-indicated one frictional coupling device with the pressure thereof being reduced to an atmospheric pressure, when the shift-up action initiation monitoring means determines that the shift-up action has been substantially initiated.

In a second preferred form of the second aspect of this invention, the apparatus further comprises fast filling means for effecting fast filling of the above-indicated other frictional coupling device with a working fluid.

According to one advantageous arrangement of the above second preferred form of the invention, the apparatus further comprises engaging pressure hold means operated after the fast filling of the above-indicated other frictional coupling device, for increasing a pressure of the other frictional coupling device at a predetermined hold level and holding the pressure at the predetermined hold level.

Where the shifting action of the automatic transmission is the shift-up action during acceleration of the motor vehicle as described above, the apparatus according to the second preferred form of the second aspect of the invention may further comprise: shift-up action initiation monitoring means for determining whether the shift-up action of the automatic transmission has been substantially initiated; and continuous pressure increase means for continuously increasing the pressure of the other frictional coupling device from the predetermined hold level at a predetermined rate, when the shift-up action initiation monitoring means determines that the shift-up action has been substantially initiated. In this case, the apparatus may further comprise: shift-up action completion monitoring means for determining whether the shift-up action of the automatic transmission is completed; and final pressure increase means for increasing the pressure of the other frictional coupling device to a maximum value thereof when the shift-up action completion monitoring means determines that the shift-up action is completed.

In a third preferred form of the apparatus according to the second aspect of the invention, the learning compensation means updates, as the control parameter, the predetermined hold time for which the pressure of the above-indicated one frictional coupling device is held at the predetermined level by the releasing pressure hold means.

In a fourth preferred form of the second aspect of the invention, the learning compensation means updates, as the control parameter, the predetermined reduction rate at which the pressure of the above-indicated one frictional coupling device is continuously reduced by the continuous pressure reduction means.

In a fifth preferred form of the apparatus of the second aspect of the invention, the learning compensation means updates, as the control parameter, the predetermine pressure level at which the pressure of the above-indicated one frictional coupling device is rapidly reduced by the rapid pressure reduction means.

In a sixth preferred form of the second aspect of the invention, the learning compensation means updates, as the control parameter, a time duration during which fast filling of the above-indicated other frictional coupling device with a working fluid is effected.

In a seventh preferred form of the second aspect of the invention, the apparatus further comprises rapid pressure reduction amount determining means for determining the predetermined pressure level on the basis of an input torque of the automatic transmission. In this case, the rapid pressure reduction amount determining means may be adapted to determine the predetermined pressure level to be higher by a predetermined amount than a critical level at which the above-indicated one frictional coupling device starts slipping at the input torque of the automatic transmission.

The object indicated above may also be achieved according to a third aspect of the present invention, which provides an apparatus for controlling an automatic transmission of a motor vehicle, wherein a shifting action of the automatic transmission is achieved by engaging a hydraulically operated frictional coupling device, the apparatus comprising: (a) pressure increasing means for increasing a pressure of the frictional coupling device to a pressure hold level, upon determination that the shifting action of the automatic transmission should be achieved; (b) pressure hold means for holding the pressure of the frictional coupling device at the pressure hold level for a predetermined time; (c) continuous pressure increase means for continuously increasing the pressure of the frictional coupling device upon expiration of the predetermined hold time; and (d) hold pressure learning compensation means for updating, by learning compensation, the pressure hold level such that the shifting action is achieved in a predetermined manner.

In the present control apparatus according to this third aspect of this invention, the hold pressure learning compensation means is provided to update or adjust the pressure hold level so that the the shifting action is achieved with an engaging action of the frictional coupling device in the predetermined manner being effected in the predetermined manner. The learning compensation of the pressure hold level is effective to permit the pressure of the frictional coupling device to be controlled in the desired pattern, irrespective of the chronological change in the operating characteristic of the frictional coupling device and the temperature variation of the working fluid supplied to the frictional coupling device. Accordingly, the present control apparatus assures sufficient stability or smoothness of the shifting action of the automatic transmission, without a considerable shifting shock.

In one preferred form of the apparatus according to the third aspect of this invention, the shifting action of the automatic transmission is a shift-up action during acceleration of the motor vehicle wherein a drive force is transmitted in a direction from an engine to a drive wheel of the motor vehicle.

According to one advantageous arrangement of the above preferred form of the third aspect of the invention, the pressure increasing means comprises fast filling means for effecting fast filling of the frictional coupling device with a working fluid, and the pressure hold means is operated after the fast filling, to increase the pressure of the frictional coupling device to the pressure hold level and hold the pressure at the pressure hold level. In this case, the apparatus may further comprise shift-up action initiation monitoring means for determining whether the shift-up action of the automatic transmission has been substantially initiated, and continuous pressure increase means for continuously increasing the pressure of the frictional coupling device from the pressure hold level at a predetermined rate, when the shift-up action initiation monitoring means determines that the shift-up action has been substantially initiated. In this instance, the apparatus may further comprise shift-up action completion monitoring means for determining whether the shift-up action of the automatic transmission is completed, and final pressure increase means for increasing the pressure of the frictional coupling device to a maximum value thereof when the shift-up action completion monitoring means determines that the shift-up action is completed.

In another preferred form of the third aspect of this invention, the apparatus further comprises speed change rate determining means for determining a rate of change of a speed of a rotary member of the automatic transmission, which speed changes due to engagement of the frictional coupling device. In this case, the hold pressure learning compensation means is adapted to update the pressure hold level such that the rate of change of the speed of the rotary member which is determined by the speed change rate determining means coincides with a predetermined target value.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawing in which:

FIG. 2 is a view indicating combinations of operating states of clutches and brakes for establishing respective operating positions of the automatic transmission of FIG. 1;

DETAILED DESCRIPTION OF THE PREFERRED EMBODIMENTS

Figure 1:
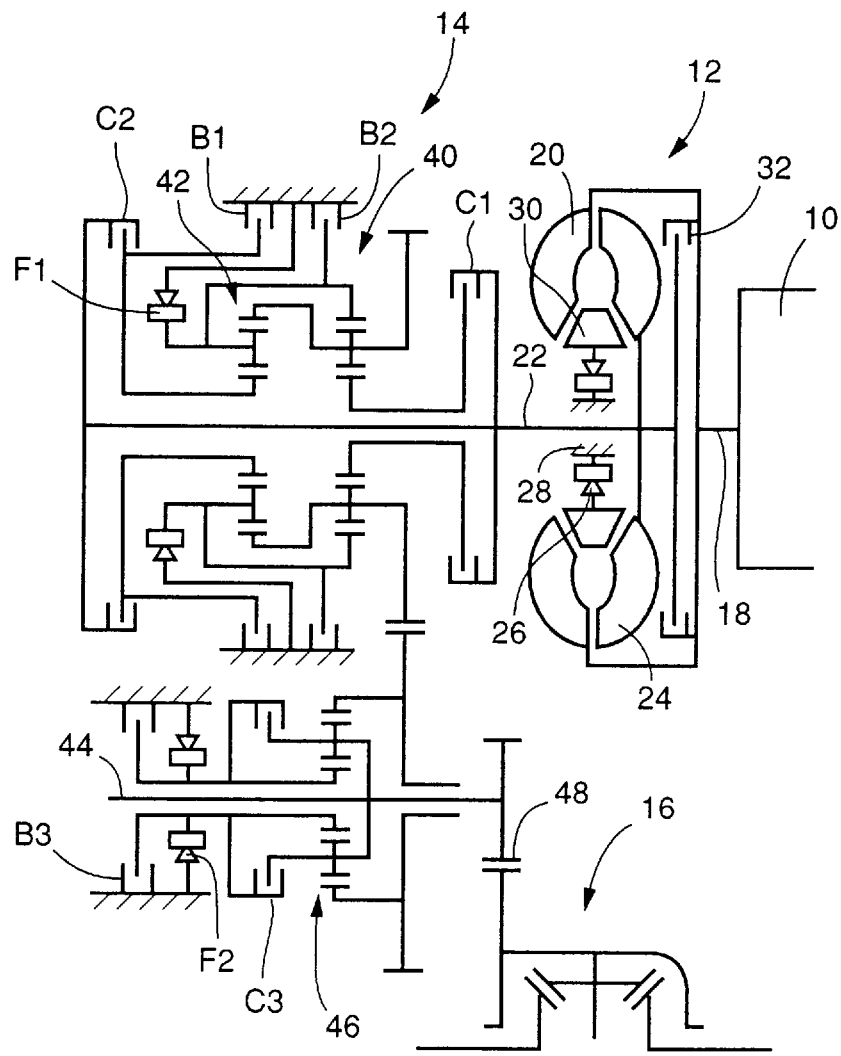
FIG. 1 is a schematic view showing a power transmitting system of a motor vehicle including an automatic transmission to which the present invention is applicable.

Referring first to FIG. 1, there is shown a power transmitting system of a motor vehicle, wherein an output of an engine 10 is transmitted to drive wheels of the vehicle through a fluid-operated power transmitting device in the form of a torque converter 12, an automatic transmission 14, and a differential gear device 16. The torque converter 12 includes a pump impeller 20 connected to a crankshaft 18 of the engine 10, a turbine impeller 24 connected to an input shaft 22 of the automatic transmission 14, a stator impeller 30 fixed through a one-way clutch 26 to a stationary member in the form of a housing 28, and a lock-up clutch 32 connected through a suitable damper to the input shaft 22.

The automatic transmission 14 includes: two single-pinion type planetary gear sets 40, 42 disposed coaxially with the input shaft 22; a planetary gear set 46 disposed coaxially with a counter shaft 44 which is parallel to the input shaft 22; and an output gear 48 which is fixed to an end of the counter shaft 44 and which meshes with the differential gear device 16. Elements of the planetary gear sets 40, 42, 46 are selectively connected to each other by selective engagement of three clutches C1, C2, C3, and are selectively fixedly connected to the housing 28 by selective engagement of three brakes B1, B2, B3. Further, the elements of the planetary gear sets 40, 42, 46 are selectively connected to each other or fixedly connected to the housing 28, through two one-way clutches F1, F2, depending upon the directions of rotation of those elements. Since the differential gear device 16 is symmetrical with respect to its axis (drive axle of the vehicle), only a half (an upper half) of the device 16 is shown in FIG. 1.

The clutches C1, C2, C3 and brakes B1, B2, B3 (which will be generally referred to as "clutches C and brakes B", where appropriate) are hydraulically operated frictional coupling devices such as multiple-disc clutches and band-brakes, which are engaged by suitable hydraulic actuators. The automatic transmission 14 has four forward-drive positions "1st", "2nd", "3rd" and "4th", as indicated in FIG. 2. With the clutches C and brakes B selectively engaged by the respective hydraulic actuators, a selected one of the four forward-drive positions of the automatic transmission 14 is established. In FIG. 2, "○" represents engaged states of the clutches C and brakes B, and "Δ" represents engaged states of the one-way clutches F1, F2 only when a drive torque is transmitted in the forward direction from the engine 10 toward the drive wheels. The one-way clutches F1, F2 are not engaged when the appropriate operating positions of the automatic transmission 14 are established with an engine brake being applied to the vehicle. It will also be noted that the absence of the symbols "○" and "Δ" indicates released states of the clutches C, brakes B and one-way clutches F1, F2.

Figure 3:
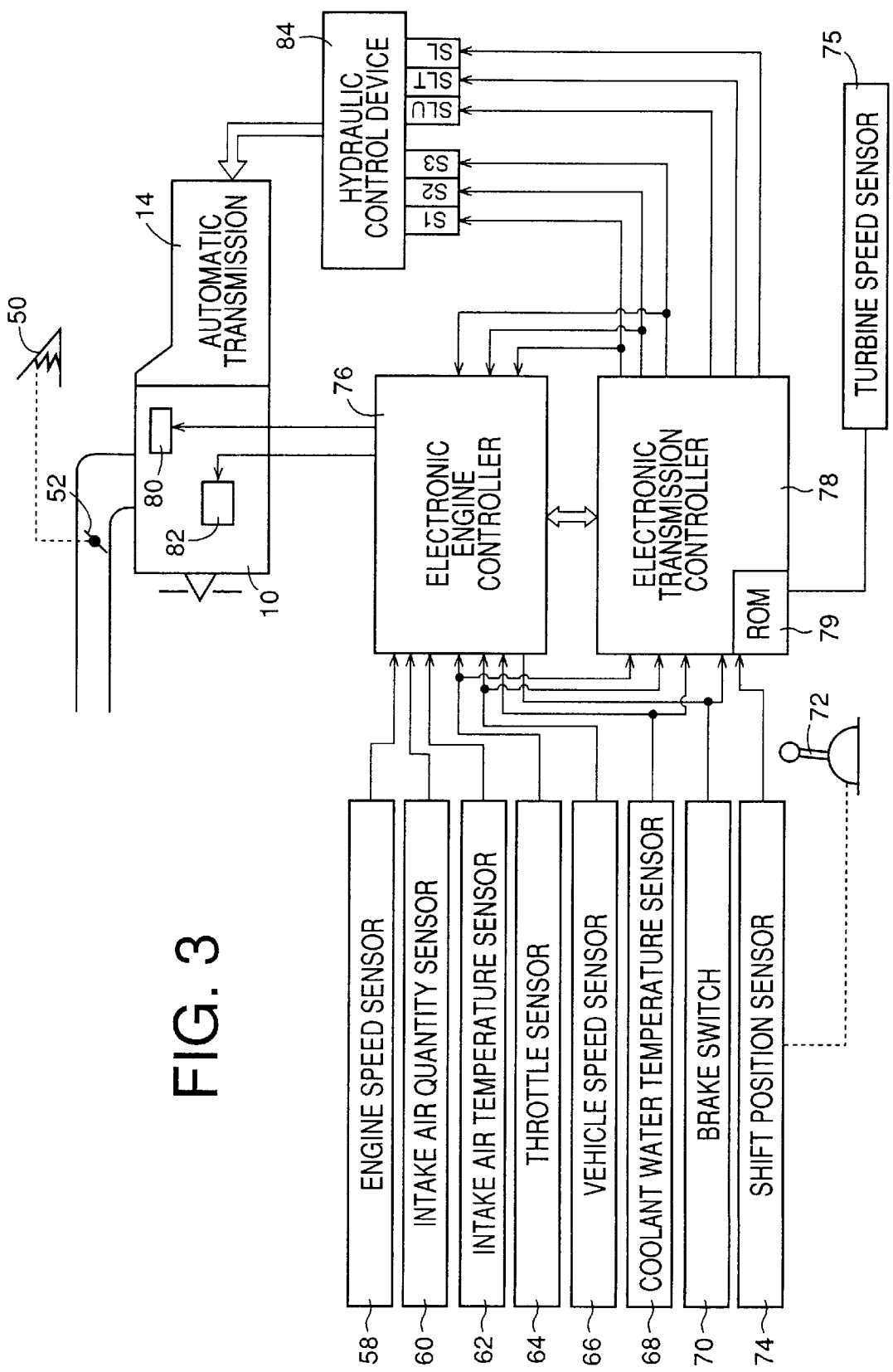
FIG. 3 is a block diagram illustrating a control system for the vehicle vehicle, including a control apparatus in the form of an electronic transmission controller constructed according to one embodiment of this invention for controlling the automatic transmission of FIG. 1

The engine 10 and the automatic transmission 14 are controlled by a control system shown in FIG. 3, wherein a throttle valve 52 is disposed in an intake pipe of the engine 10. The throttle valve 52 is operatively linked with an accelerator pedal 50. The control system includes an electronic engine controller 76 and an electronic transmission controller 78 which are connected to each other. The engine controller 76 is adapted to receive output signals of an engine speed sensor 58, an intake air quantity sensor 60, an intake air temperature sensor 62, a throttle sensor 64, a vehicle speed sensor 66, a coolant water temperature sensor 68 and a BRAKE switch 70, while the transmission controller 78 is adapted to receive the output signals of the sensors 64, 66, 68 and BRAKE switch 70, and an output signal of a shift position sensor 74. The output signal of the engine speed sensor 58 represents a speed $N_E$ of the engine 10. The output signal of the intake air quantity sensor 70 represents an intake air quantity Q of the engine 10. The output signal of the intake air temperature sensor 62 represents a temperature $T_A$ of the intake air of the engine 10. The output signal of the throttle valve 52 represents an opening angle θ of the throttle valve 52. The output signal of the vehicle speed sensor 66 represents a rotating speed $N_{OUT}$ of the counter shaft 44, which can be used to calculate a running speed V of the motor vehicle. The output signal of the coolant water temperature sensor 68 represents a temperature $T_W$ of a coolant water of the engine 10. The output signal of the BRAKE switch 70 indicates an operating state of a brake pedal (not shown). The output signal of the shift position sensor 74 represents a currently selected or established position $P_{sh}$ of a shift lever 72. The transmission controller 78 also receives an output signal of a turbine speed sensor 75 representative of a rotating speed $N_T$ of the turbine impeller 24, that is, a rotating speed $N_{IN}$ of the input shaft 22 of the automatic transmission 14. The speed $N_{IN}$ will be referred to as "input speed of the automatic transmission 14" where appropriate.

The engine controller 76 is a so-called microcomputer incorporating a central processing unit (CPU), a random-access memory (RAM), a read-only memory (ROM), and an input and output interface. The CPU of the engine controller 76 operates according to control programs stored in the ROM while utilizing a temporary data storage function of the RAM, to process the received output signals of the sensors indicated above, for effecting various control operations to control the engine 10, such as an operation to control a fuel injector valve 80 for controlling an amount of injection of a fuel, an operation to control an ignitor 82 for controlling the ignition timing of the engine 10, and an operation to control a well known by-pass valve for controlling an idling speed of the engine 10.

The transmission controller 78 is also a microcomputer similar to that of the engine controller 76. A CPU of the microcomputer of the transmission controller 78 is also adapted to operate according to control programs stored in a ROM 79 while utilizing a temporary data storage function of a RAM, to process the received output signals of the sensors, for controlling various solenoid-operated valves S1, S2, S3, SL and linear solenoid valves SLU, SLT used in a hydraulic control device 84 for the automatic transmission 14. For instance, the transmission controller 78 controls the linear solenoid valve SLT so as to generate an output pressure $P_{SLT}$ corresponding to the opening angle θ of the throttle valve 52, controls the linear solenoid valve SLU so as to control an amount of slip $N_{SLIP}$ of the lock-up clutch 32, and controls the solenoid-operated valve SL for selectively engaging and releasing the lock-up clutch 32. The transmission controller 78 is further adapted to determine whether the automatic transmission 14 should be shifted up or down from the currently established position to another position, on the basis of the detected opening angle θ of the throttle valve 52 and running speed V of the vehicle, and according to predetermined shift patterns, and whether the lock-up clutch 32 should be engaged or released. According to results of these determinations, the transmission controller 78 controls the solenoid-operated valves S1, S2, S3 so as to shift the automatic transmission 14 and controls the operating state of the lock-up clutch 32.

Figure 4:
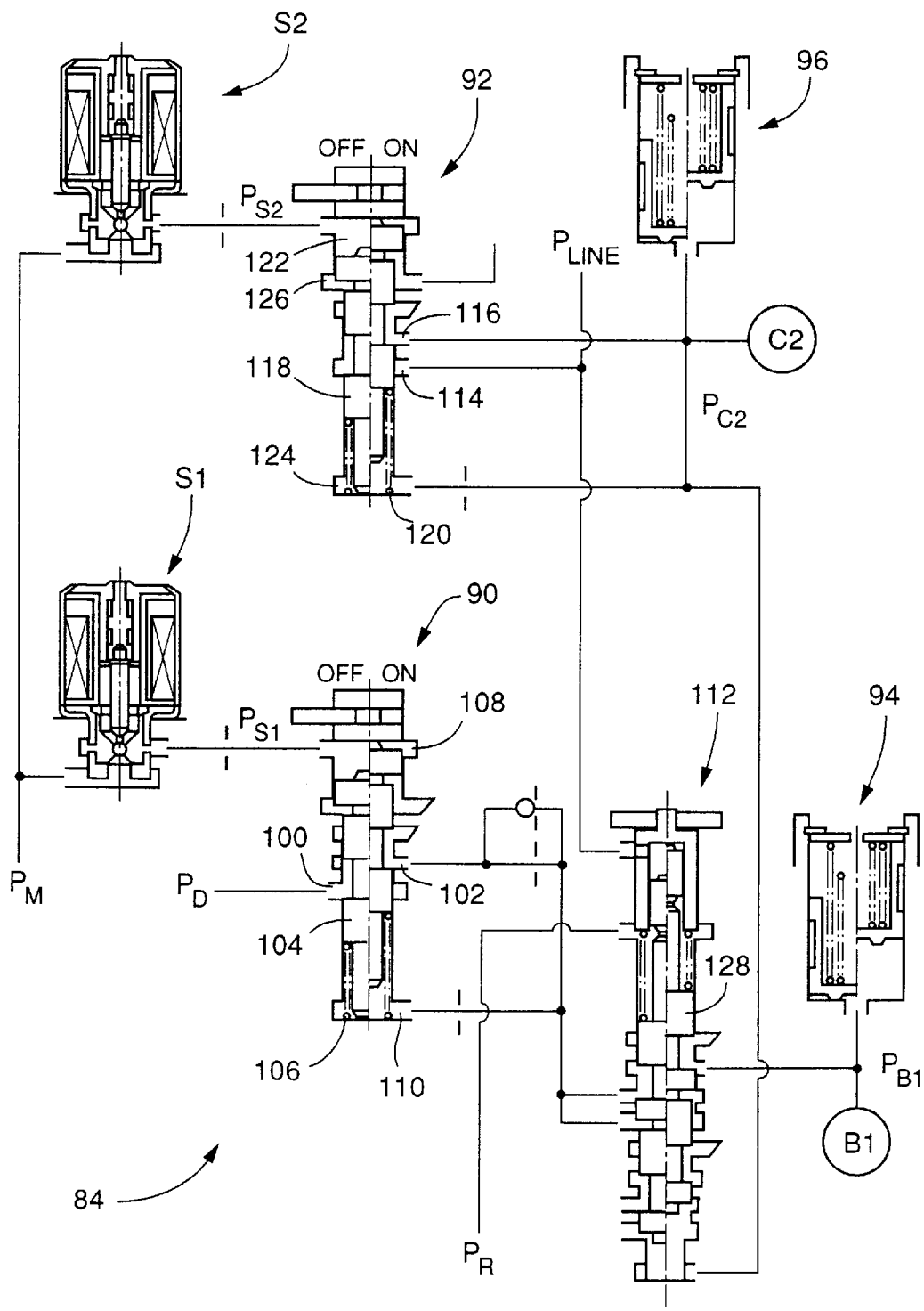
FIG. 4 is a view showing a part of a hydraulic control device for the automatic transmission, which device is shown in FIG. 3.

Referring to FIG. 4, there are shown components of the hydraulic control device 84, which control the engaging and releasing actions of the brake B1 and clutch C2 used to establish the second-speed and third-speed positions "2nd" and "3rd" of the automatic transmission 14. In the hydraulic control device 84, the solenoid-operated valves S1 and S2 receive a MODULATOR PRESSURE $P_M$ which is obtained by regulating a line pressure $P_{LINE}$. These solenoid-operated valves S1, S2 are controlled according to drive signals received from the transmission controller 78. The drive signals indicate duty ratios of the valves S1, S2, namely, drive currents $I_{S1}$ and $I_{S2}$ for energizing the solenoid coils of the valves S1, S2. The valves S1, S2 generate control pressures $P_{S1}$ and $P_{S2}$ corresponding to the amounts of the received drive currents $I_{S1}$, $I_{S2}$. The control pressures $P_{S1}$, $P_{S2}$ are applied to a B1 pressure regulating valve 90 and a C2 pressure regulating valve 92, respectively, so that pressures $P_{B1}$ and $P_{C1}$ are applied to the brake B1 and the clutch C2, respectively. To the brake B1 and clutch C2, there are connected a B1 damper 94 and a C2 damper 96, respectively, for absorbing pulsation of the pressures $P_{B1}$, $P_{C2}$.

The B1 pressure regulating valve 90 has: an input port 100 for receiving a FORWARD DRIVE pressure $P_D$ which is generated from a manual valve when the shift lever 72 is operated to one of forward-drive positions such as DRIVE position "D", THIRD position "3", SECOND position "2" and LOW position "L"; an output port 102 through which the pressure $P_{B1}$ is applied to the brake B1; a spool 104 for connecting and disconnecting the input and output ports 100, 102 to and from each other; a spring 106 for biasing the spool 104 in a valve-closing direction for disconnecting the input and output ports 100, 102; an oil chamber 108 adapted to receive the control pressure $P_{S1}$ which biases the spool 104 in a valve-opening direction for connecting the input and output ports 100, 102; and a feedback oil chamber 110 accommodating the spring 106 and adapted to receive the pressure $P_{B1}$ as a feedback pressure which biases the spool 104 in the valve-closing direction. The B1 pressure regulating valve 90 regulates the pressure $P_{B1}$ on the basis of the control pressure $P_{S1}$ according to the following equation (1):

$$P_{B1}=(S1 \cdot P_{S1}-W1)/S2 \ldots \quad (1)$$

In the above equation (1), "S1" and "S2" represent a pressure-receiving area of the oil chamber 108 and a pressure-receiving area of the feedback oil chamber 110, while "W1" represents a biasing force of the spring 106. The pressure-receiving area S1 is larger than the pressure-receiving area S2.

The thus regulated pressure $P_{B1}$ is applied to the brake B1 through a fail-safe valve 112.

The C2 pressure regulating valve 92 has: an input port 114 adapted to receive the line pressure $P_{LINE}$; an output port 116 through which the pressure $P_{C2}$ is applied to the clutch C2; a spool 118 for connecting and disconnecting the input and output ports 114, 116 to and from each other; a spring 120 for biasing the spool 118 in a valve-closing direction for disconnecting the input and output ports 114, 116 from each other; an oil chamber 122 adapted to receive the control pressure $P_{S2}$ which biases the spool 118 in a valve-opening direction for connecting the input and output ports 114, 116; a feedback oil chamber 124 accommodating the spring 120 and adapted to receive the pressure $P_{C2}$ as a feedback pressure which biases the spool 118 in the valve-closing direction; and an oil chamber 126 adapted to receive a LOW POSITION pressure $P_L$ which is generated upon operation of the shift lever 72 to the LOW position "L" and which acts to hold the spool 118 in the closed position. The C2 pressure regulating valve 92 regulates the pressure $P_{C2}$ on the basis of the control pressure $P^{S2}$, according to the following equation (2):

$$P_{C2}=(S3 \cdot P_{S2}-W2)/S4 \ldots \quad (2)$$

In the above equation (2), "S3" and "S4" represent a pressure-receiving area of the oil chamber 122 and a pressure-receiving area of the feedback oil chamber 124, while "W2" represents a biasing force of the spring 120. The pressure-receiving area S3 is larger than the pressure-receiving area S4.

The thus regulated pressure $P_{C2}$ is applied to the clutch C2.

The fail-safe valve 112 is provided to protect the brakes B1, B2 upon simultaneous generation of the pressure $P_{C2}$ for the clutch C2, the pressures $P_{B1}$ and $P_{B2}$ for the brakes B1, B2. In the event the pressure $P_{C2}$ is raised simultaneously with the pressure $P_{B1}$ or $P_{B2}$, a spool 128 of the fail-safe valve 112 is moved up as seen in FIG. 4, so as to cut the pressure $P_{B1}$ for the brake B1 or the pressure $P_{B2}$ for the brake B2.

Figure 5:
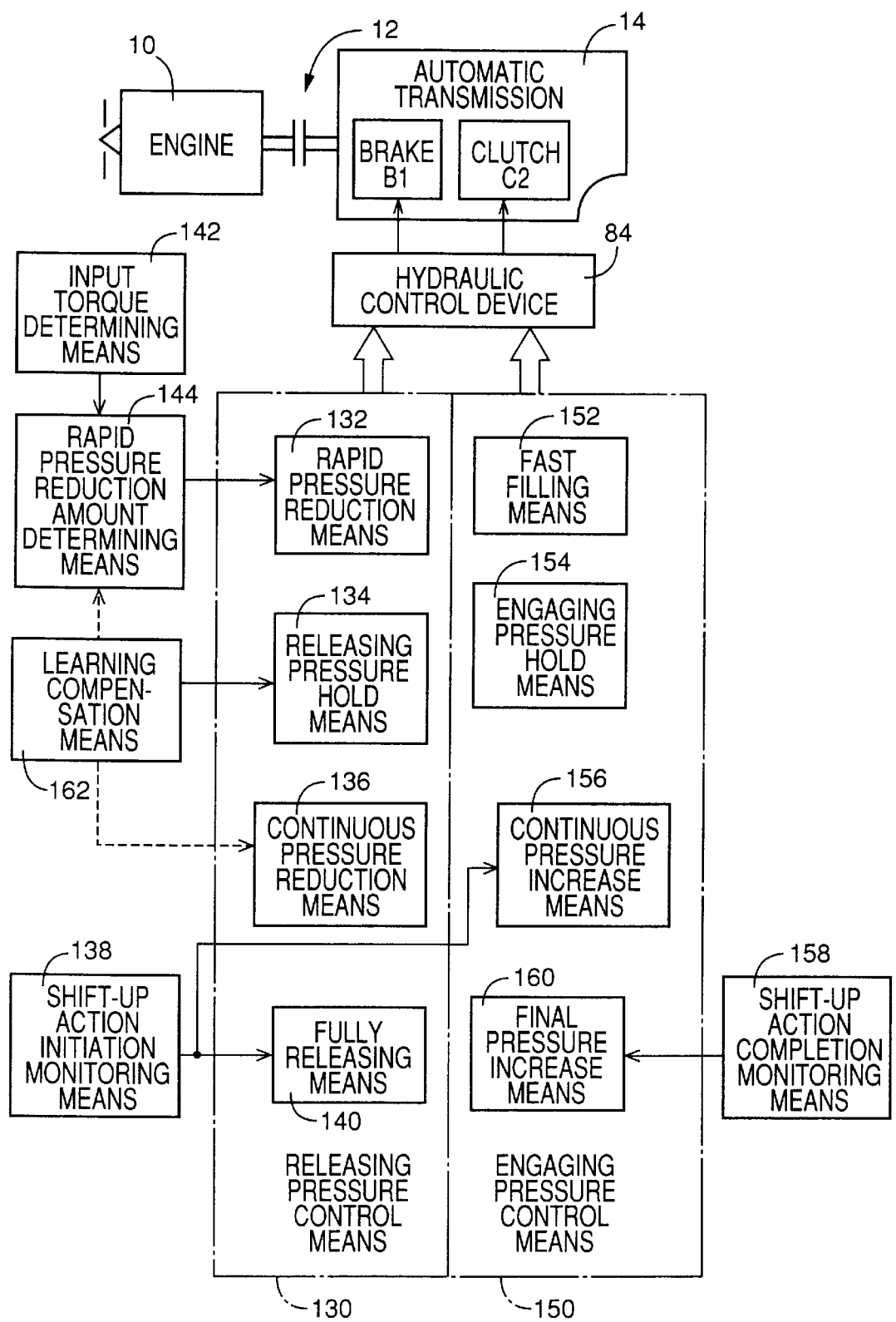
FIG. 5 is a block diagram illustrating various functional means of the transmission controller of FIG. 3.

Referring next to the block diagram of FIG. 5, there will be described the functions of the various functional means of the electronic transmission controller 78. This transmission controller 78 includes releasing pressure control means 130, shift-up action initiation monitoring means 138, input torque determining means 142, rapid pressure reduction amount determining means 144, shift-down action initiation monitoring means 136, input torque determining means 144, engaging pressure control means 150, shift-up action completion monitoring means 158, and learning compensation means 162.

Figure 6:
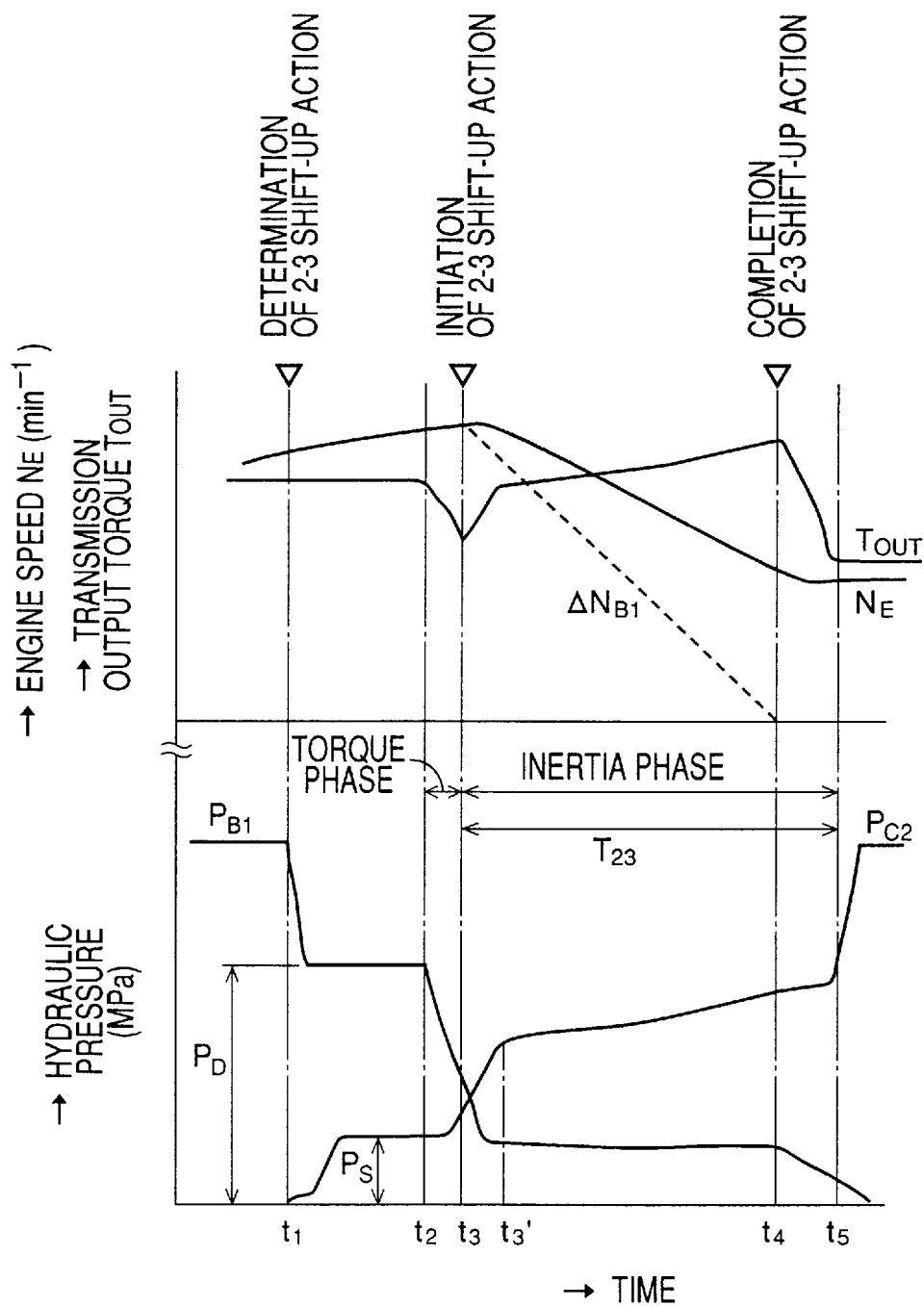
FIG. 6 is a time chart indicating changes of an engine speed $N_E$ (=$N_T$) an output torque $T_{OUT}$ of the automatic transmission, a pressure $P_{B1}$ of brake B1 and a pressure $P_{C2}$ of clutch C2 during a 2–3 shift-up action of the automatic transmission, when the pressures $P_{B1}$ and $P_{C2}$ are controlled by the transmission controller whose functional means are illustrated in FIG. 5.

The releasing pressure control means 130 is adapted to adapted to control the pressure $P_{B1}$ of the brake B1 upon a 2–3 shift-up action of the automatic transmission 14 from the second-speed position "2nd" to the third-speed position "3rd", during acceleration of the vehicle with the accelerator pedal 50 being in a depressed state, that is, while a drive force is transmitted in a direction from the engine 10 to the drive wheels of the motor vehicle. To achieve the 2–3 shift-up action, the brake B1 provided as a frictional coupling device is released, while the clutch C2 provided as another frictional coupling device is engaged, as indicated in FIG. 2. This shift-up action with the accelerator pedal 50 in the depressed state is referred to as "ACCELERATOR-ON" 2–3 shift-up action. The releasing pressure control means 130 controls the pressure $P_{B1}$ of the brake B1, as indicated in FIG. 6 by way of example, so as to permit the ACCELERATOR-ON 2–3 shift-up action to be achieved in a smooth manner without a shifting shock of the automatic transmission 14.

The releasing pressure control means 130 incorporates rapid pressure reduction means 132, releasing pressure hold means 134, continuous pressure reduction means 136, and fully releasing means 140.

The rapid pressure reduction means 132 is operated upon determination of the 2–3 shift-up action of the automatic transmission 14, to rapidly reduce the pressure $P_{B1}$ from the maximum level to a predetermined level $P_D$ slightly higher than a level at which the brake B1 begins to slip. The releasing pressure hold means 134 is adapted to hold the pressure $P_{B1}$ at the predetermined level $P_D$ for a predetermined pressure hold time $T_D$, until the fast filling of the clutch C2 which is engaged to achieve the 2–3 shift-up action is completed, that is, until the piston of the clutch C2 has been moved into abutting contact with one of two friction members of the clutch C2, to initiate a frictional coupling action. The continuous pressure reduction means 136 is operated after expiration of the pressure hold time $T_D$, to continuously reduce the pressure $P_{B1}$ from the level $P_D$ at a predetermined reduction rate $\Delta P_{S1}$. The continuous reduction of the pressure $P_{B1}$ is initiated before initiation of the 2–3 shift-up action of the automatic transmission 14. When the shift-up action initiation monitoring means 138 determines that the 2–3 shift-up action of the automatic transmission 14 has been initiated, the fully releasing means 140 is operated to fully release the brake B1 by reducing the pressure $P_{B1}$ to the atmospheric pressure. That is, while the pressure $P_{B1}$ is continuously reduced by the continuous pressure reduction means 136, the solenoid-operated valve S1 is commanded to fully release the brake B1. However, the pressure $P_{B1}$ is continuously reduced during a period t2–t4 as indicated in FIG. 6. During this continuous pressure reduction period t2–t4, the rate of reduction of the pressure $P_{B1}$ is reduced due to a pressure accumulating effect of the damper 94, as indicated at point t3' in FIG. 6.

The input torque determining means 142 is adapted to determine an input torque $T_I$ of the automatic transmission 14, namely, a torque $T_I$ of the input shaft 22. Described in detail, the input torque determining means 142 first determines an output torque $T_E$ of the engine 10 on the basis of the detected engine speed $N_E$ and throttle opening angle $\theta$, and according to a stored predetermined relationship of the output torque $T_E$ with the engine speed $N_E$ and throttle opening angle θ. Then, the input torque determining means 142 determines a torque ratio or boosting ratio "t" of the torque converter 12, on the basis of a speed ratio "e"=$N_T/N_E$ of the detected speed $N_T$ of the turbine impeller 24 and the detected speed $N_E$ of the engine 10 (pump impeller 20), and according to a stored predetermined relationship between the torque ratio "t" and the speed ratio "e". The input torque determining means 142 determines the input torque $T_I$ of the automatic transmission 14 on the basis of the engine output torque $T_E$ and the torque ratio "t".

The rapid pressure reduction amount determining means 144 is adapted to determine the pressure level $P_D$ to which the pressure $P_{B1}$ is reduced by the rapid pressure reduction means 132. The determining means 144 determines the pressure level $P_D$ on the basis of the input torque $T_I$ of the automatic transmission 14 determined by the input torque determining means 142, and according to a stored predetermined relationship between the pressure level $P_D$ and the input torque $T_I$. This relationship may be formulated such that the pressure level $P_D$ linearly increases with an increase in the input torque $T_I$, according to an equation $P_D = A \times T_I + B$, and such that the pressure level $P_D$ is higher by a predetermined amount than a level at which the brake B1 starts slipping, in other words, such that the brake B1 is about to slip but is not slipping at the pressure level $P_D$. Alternatively, the pressure level $P_D$ is determined to be slightly lower than the level at which the brake B1 starts slipping.

The engaging pressure control means 150 incorporates fast filling means 152, engaging pressure hold means 154, continuous pressure increase means 156 and final pressure increase means 160.

The fast filling means 152 is operated upon determination of the 2–3 shift-up action of the automatic transmission 14, to apply a maximum drive signal to the solenoid-operated valve S2 for a predetermined short time, for fast filling of the clutch C2. The maximum drive signal corresponds to the maximum pressure $P_{C2}$. The engaging pressure hold means 154 is adapted to increase the pressure $P_{C2}$ of the clutch C2 to a predetermined hold level $P_S$ and hold the pressure at this hold level $P_S$ for a predetermined time. The hold level $P_S$ may be slightly lower or higher than a level at which the torque begins to be transmitted through the clutch C2. When the hold level $P_S$ is slightly higher than the above level, a small amount of torque is transmitted through the partially engaged clutch C2. Upon determination of the substantial initiation of the 2–3 shift-up action by the shift-up action initiation monitoring means 138, the continuous pressure increase means 156 starts a continuous increase of the pressure $P_{C2}$ from the hold level $P_S$ at a predetermined rate. The pressure $P_{C2}$ is continuously reduced during a period t3–t4 by the continuous pressure increase means 156. The rate of increase of the pressure $P_{C2}$ is reduced during the period t3–t4, as indicated at point t3' in FIG. 6.

The shift-up action completion monitoring means 158 is adapted to determine whether the 2–3 shift-up action has been completed. Upon determination of completion of the 2–3 shift-up action, the final pressure increase means 160 is operated to increase the pressure $P_{C2}$ to the maximum value. The shift-up action completion monitoring means 158 determines the completion of the 2–3 shift-up action when the monitoring means 158 determines that the input speed of the automatic transmission 14 (speed $N_T$ of the turbine impeller 24) has become equal to a product ($\rho_{3RD} \times N_{OUT}$) of the output speed $N_{OUT}$ of the automatic transmission 14 and a speed ratio $\rho_{3RD}$ of the third-speed position "3rd" of the automatic transmission 14.

The learning compensation means 162 is provided to adjust or update, by learning compensation, a selected control parameter which influences the pattern of change of the pressure $P_{B1}$ of the brake B1, such that the ACCELERATOR-ON 2–3 shift-up action of the automatic transmission 14 is achieved in a predetermined manner, for instance, so that a rate of speed change $\Delta N_{B1}$ of a selected rotary member of the automatic transmission 14 whose speed changes upon initiation of a change in the input speed $N_T$ (upon initiation of an inertia phase of the 2–3 shift-up action of the transmission 14) coincides with a target value $\Delta N_{B1M}$ during the 2–3 shift-up action. For example, the rotary member is the hub of the brake B1 or the sun gear of the planetary gear device 42, whose speed begins to change upon initiation of slipping of the brake B1.

In the present first embodiment, the control parameter to be updated by the learning compensation means 162 is the pressure hold time $T_D$ during which the pressure $P_{B1}$ of the brake B1 is held at the level $P_D$.

Figure 7:
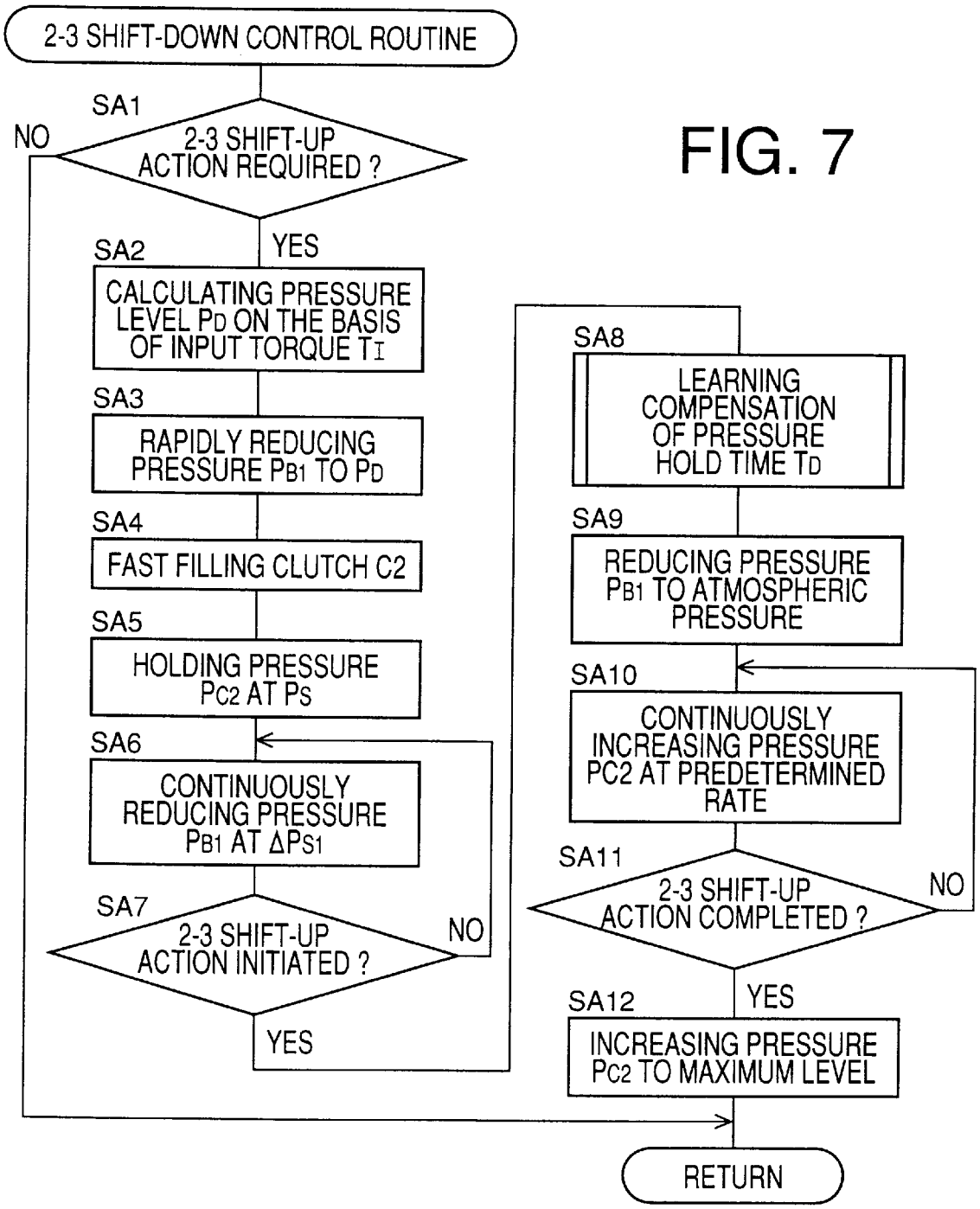
FIG. 7 is a flow chart illustrating an example of a 2–3 shift-up control routine executed by the transmission controller of FIG. 3.
Figure 8:
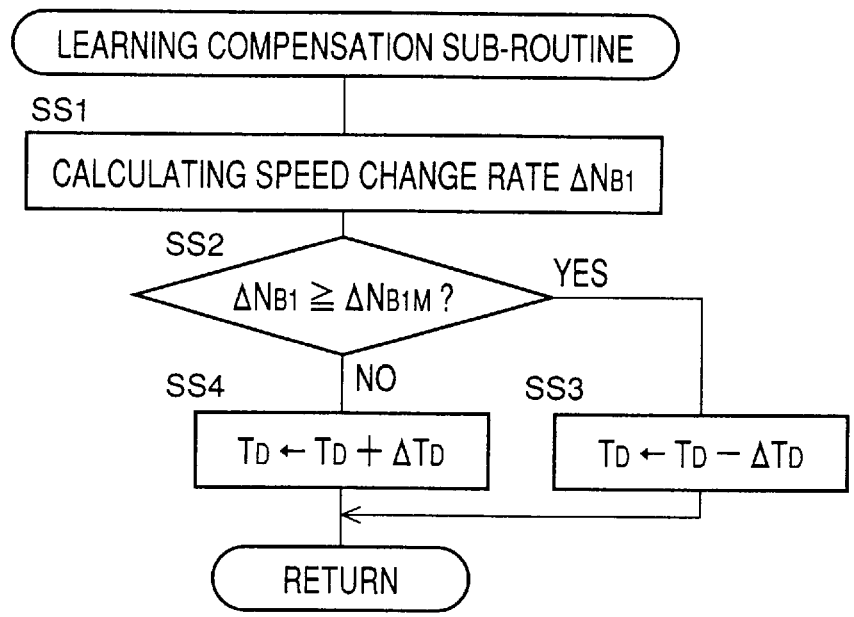
FIG. 8 is a flow chart illustrating a learning compensation sub-routine executed in step SA8 of the 2–3 shift-up control routine of FIG. 7.

The transmission controller 78 is adapted to execute a 2–3 shift-up control routine illustrated in the flow chart of FIG. 7. This control routine includes step SA8 in which a learning compensation sub-routine illustrated in the flow chart of FIG. 8 is implemented by the learning compensation means 162.

Figure 10:
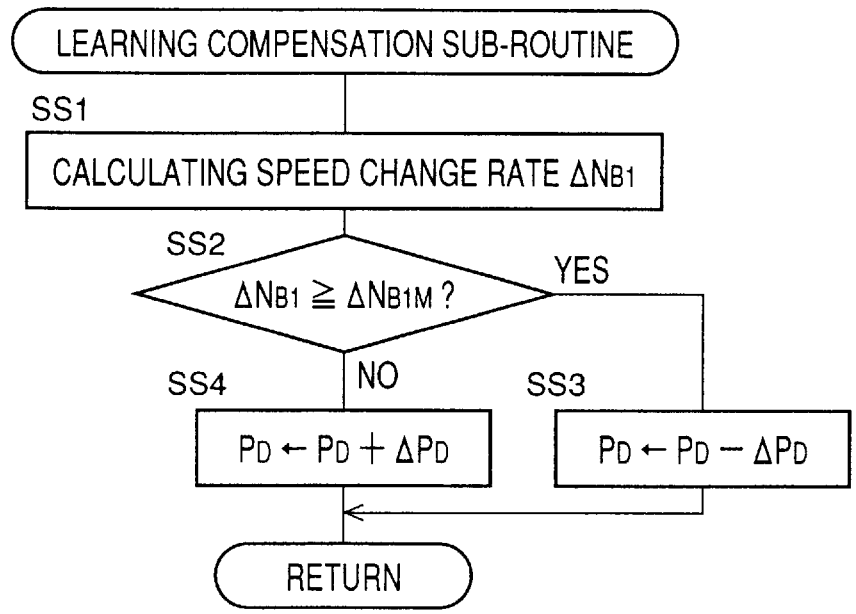
FIG. 10 is a flow chart illustrating a learning compensation sub-routine corresponding to that of FIG. 8, used in a second embodiment of this invention.

The 2–3 shift-up control routine of FIG. 7 is initiated with step SA1 to determine whether the automatic transmission 14 should be shifted up from the second-speed position "2nd" to the third-speed position "3rd", with the accelerator pedal 50 being depressed. This determination is effected by determining whether a point defined by the detected throttle opening angle θ and running speed V of the vehicle has moved across a stored predetermined 2–3 shift-up boundary line which is a relationship between the throttle opening angle θ and running speed V. Alternatively, the determination in step SA1 is effected by determining whether the shift lever 72 is operated from the THIRD position "3" or SECOND position "2" to the THIRD position "3" or LOW position "L". If a negative decision (NO) is obtained in step SA1, one cycle of execution of the routine of FIG. 10 is terminated. If an affirmative decision (YES) is obtained in step SA1, the control flow goes to step SA2 corresponding to the input torque determining means 142 and the rapid pressure reduction amount determining means 144.

Step SA2 is provided to first calculate the input torque $T_I$ of the automatic transmission 14 and then calculate the pressure level $P_D$ on the basis of the calculated input torque $T_I$ and according to the predetermined relationship $P_D = A \times T_I + B$. Described in detail, the output torque $T_E$ of the engine 10 is calculated on the basis of the detected engine speed $N_E$ and throttle opening angle θ and the predetermined relationship. Then, the torque ratio or boosting ratio "r" of the torque converter 12 is calculated on the basis of the obtained speed ratio e=$N_T/N_E$ and according to the predetermined relationship. Then, the input torque $T_I$ of the automatic transmission 14 is calculated by multiplying the engine output torque $T_E$ by the torque ratio "t" of the torque converter 12.

Then, the control flow goes to step SA3 corresponding to the rapid pressure reduction means 132 and the releasing pressure hold means 134, to reduce the pressure $P_{B1}$ of the brake B1 to the calculated pressure level $P_D$, as indicated at point "t1" in the graph of FIG. 6, and hold the pressure $P_{B1}$ at the level $P_D$ for the predetermined pressure hold time $T_D$. This pressure hold time $T_D$ is determined to be sufficient for permitting the piston of the clutch C2 to be moved into abutting contact with one of the two friction members of the clutch C2.

Step SA3 is followed by step SA4 corresponding to the fast filling means 152, wherein the maximum drive signal corresponding to the maximum pressure $P_{C2}$ is applied to the solenoid-operated valve S2 (FIG. 4) for the predetermined short time so that the clutch C2 is rapidly filled with the working fluid, so that the piston of the clutch C2 is moved into abutting contact with the appropriate friction member. Then, the control flow goes to step SA5 corresponding to the engaging pressure hold means 154, to increase the pressure $P_{C2}$ to the predetermined pressure hold level $P_S$ and hold it at this level $P_S$. Step SA5 is followed by step SA6 corresponding to the continuous pressure reduction means 136, to continuously reduce the pressure $P_{B1}$ from the level $P_D$ at the predetermined reduction rate $\Delta P_{S1}$, as indicated at point "t2" in FIG. 6.

Then, the control flow goes to step SA7 corresponding to the shift-up action initiation monitoring means 138, to determine whether the 2–3 shift-up action of the automatic transmission 14 has been substantially initiated. This determination is effected by determining whether the input speed of the automatic transmission 14 (speed $N_T$ of the turbine impeller 24) begins to decrease. If a negative decision (NO) is obtained in step SA7, the control flow goes back to step SA6. The continuous reduction of the pressure $P_{B1}$ at the rate $\Delta P_{S1}$ is continued with the pressure $P_{C2}$ held at the level $P_S$, with step SA6 being repeatedly implemented until an affirmative decision (YES) is obtained in step SA7.

When the affirmative decision (YES) is obtained in step SA7, the control flow goes to step SA8 corresponding to the learning compensation means 162, to execute a learning compensation sub-routine illustrated in the flow chart of FIG. 8, in which the pressure hold time $T_D$ during which the pressure $P_{B1}$ is held at the level $P_D$ is updated or adjusted. The pressure hold time $T_D$ updated in step SA8 is used in the next control cycle if the input torque $T_I$ is the same as that calculated in step SA2 in the present control cycle.

The learning compensation sub-routine of FIG. 8 is initiated with step SS1 to calculate the rate of speed change $\Delta N_{B1}$ of the selected rotary member of the automatic transmission 14, on the basis of the output signal of an appropriate speed sensor. The speed of this rotary member changes upon initiation of the inertia phase of the 2–3 shift-up action or upon initiation of slipping of the brake B1. For instance, the rotary member may be the hub of the brake B1 or the sun gear of the planetary gear device 42. Then, the control flow goes to step SS2 to determine whether the calculated rate of speed change $\Delta N_{B1}$ is equal to or higher than a predetermined target value $\Delta N_{B1M}$. If an affirmative decision (YES) is obtained in step SS2, the control flow goes to step SS3 in which the presently effective pressure hold time $T_D$ is decremented by a predetermined decrement $\Delta T_D$ so that the actual rate of speed change $\Delta N_{B1}$ is reduced toward the target value $\Delta N_{B1M}$. If a negative decision (NO) is obtained in step SS2, the control flow goes to step SS4 in which the presently effective pressure hold time $T_D$ is incremented by a predetermined increment $\Delta T_D$ so that the actual rate of speed change $\Delta N_{B1}$ is increased toward the target value $\Delta N_{B1M}$. The thus updated pressure hold time $T_D$ is used in the next control cycle for initiating the continuous reduction of the pressure $P_{B1}$ in step SA6.

Figure 9:
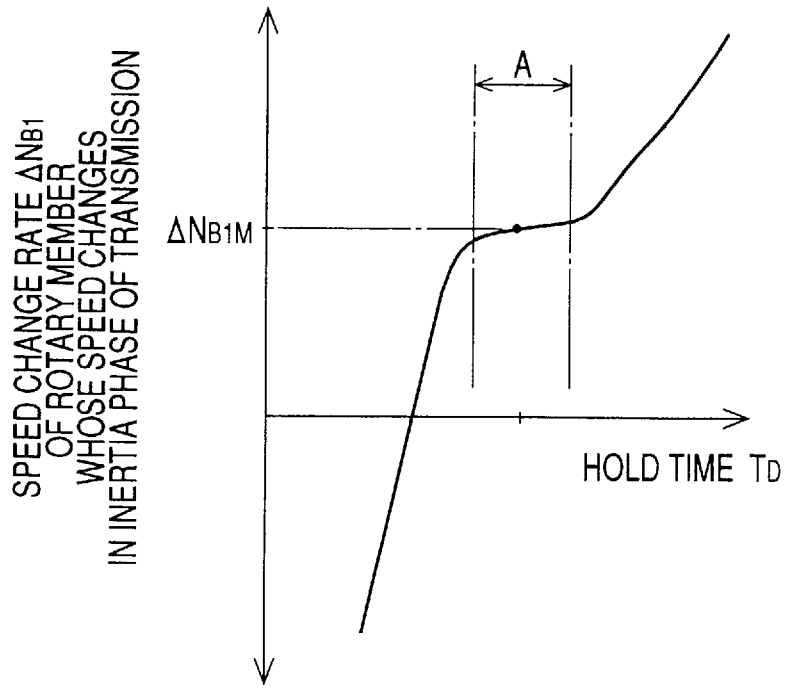
FIG. 9 is a view indicating a relationship between a pressure hold time $T_D$ updated by learning compensation in the sub-routine of FIG. 8 and a rate of speed change $\Delta N_{B1}$ associated with the brake B1.

Between the rate of change $\Delta N_{B1}$ of the speed of the selected rotary member and the pressure hold time $T_D$, there exists a relationship as indicated in the graph of FIG. 9. The pressure hold time $T_D$ is updated in the learning compensation sub-routine of FIG. 8 so that the rate of speed change $\Delta N_{B1}$ falls within an optimum range A indicated in FIG. 9 by way of example, whereby the rate of speed change $\Delta N_{B1}$ is held almost constant so as to permit the 2–3 shift-up action to be performed in the desired manner. If the pressure hold time $T_D$ is shorter than the lower limit of the optimum range A, the brake B1 starts slipping at an earlier point of time than desired, resulting in the actual speed change rate $\Delta N_{B1}$ being lower than the target value $\Delta N_{B1M}$, whereby the engine speed $N_E$ tends to suffer from an overshoot (temporary abrupt rise) during the 2–3 shift-up action of the automatic transmission 14. If the pressure hold time $T_D$ is longer than the upper limit of the optimum range A, the brake B1 starts slipping at a later point of time than desired, resulting in the actual speed change rate $\Delta N_{B1}$ being higher than the target value $\Delta N_{B1M}$, whereby the output torque $T_{OUT}$ of the automatic transmission 14 tends to be temporarily lowered during the 2–3 shift-up action.

Referring back to the routine of FIG. 7, step SA8 (sub-routine of FIG. 8) is followed by step SA9 corresponding to the fully releasing means 140, in which the solenoid-operated valve S1 is commanded to fully release the brake B1, with the pressure $P_{B1}$ being eventually reduced to the atmospheric pressure. Then, the control flow goes to step SA10 corresponding to the continuous pressure increase means 156, in which the pressure $P_{C2}$ of the clutch C2 is continuously increased from the level $P_S$, as indicated at point "t3" in FIG. 6.

Step SA10 is followed by step SA11 corresponding to the shift-up action completion monitoring means 158, to determine whether the shift-up action is completed. The determination in step SA11 is effected by determining whether the input speed $N_T$ of the automatic transmission 14 has become equal to the output speed $N_{OUT}$ multiplied by the speed ratio $\rho_{3RD}$ of the third-speed position "3rd" of the automatic transmission 14. If a negative decision (NO) is obtained in step SA11, the control flow goes back to step SA10. The continuous increase of the pressure $P_{C2}$ is continued with step SA10 being repeatedly implemented, until an affirmative decision (YES) is obtained in step SA11, that is, during the period t3–t4 indicated in FIG. 6.

When the affirmative decision (YES) is obtained in step SA11, the control flow goes to step SA12 corresponding to the final pressure increase means 160, to increase the pressure $P_{C2}$ toward its maximum value, a given time after the determination of completion of the 2–3 shift-up action, as indicated at "t4" and "t5" in FIG. 6.

In the present control apparatus for controlling the automatic transmission 14, the learning compensation means 162 (step SA8) is provided to update or adjust the pressure hold time $T_D$ so that the pressure $P_{B1}$ of the brake $B_1$ is changed in the desired pattern during the 2–3 shift-up action, which is a so-called "clutch-to-clutch shifting action" wherein the brake B1 is released while at the same time the clutch C2 is engaged. The learning compensation of in the pressure hold time $T_D$ which influences the pattern of change of the pressure $P_{B1}$ is effective to permit the pressures $P_{B1}$ and $P_{C2}$ to be controlled in the desired pattern, irrespective of a chronological change in the operating characteristics of the brake B1 and clutch C2, and a variation in the temperature of the working fluid which is discharged from the brake $B_1$ and supplied to the clutch C2. Accordingly, the present control apparatus assures sufficient stability or smoothness of the 2–3 shift-up action of the automatic transmission 14, without a considerable shifting shock or a considerable overshoot of the engine speed $N_E$.

Further, the present control apparatus is arranged such that upon determination of the 2–3 shift-up action of the automatic transmission 14, the pressure $P_{B1}$ of the brake B1 is first rapidly reduced by the rapid pressure reduction means 132 (step SA3), to the level $P_D$ which is determined to be slightly higher than the level at which the brake B1 starts slipping. The pressure $P_{B1}$ is held by the releasing pressure hold means 134 (step SA3), at the determined level $P_D$ for the predetermined time. Then, the pressure $P_{B1}$ is continuously reduced by the continuous pressure reduction means 136 (SA6) at the predetermined rate $\Delta P_{S1}$. Upon determination of the substantial initiation of the 2–3 shift-up action by the shift-up action initiation monitoring means 138 (SA7), the brake B1 is fully released to the atmospheric pressure by the fully releasing means 140 (SA9). On the other hand, the pressure $P_{C2}$ of the clutch C2 is held by the engaging pressure hold means 154 (step SA5), at the predetermined level $P_S$ and is then continuously increased at the predetermined rate by the continuous pressure increase means 156 (SA10) after the determination of the substantial initiation of the 2–3 shift-up action by the monitoring means 138 (SA7). Upon determination of the completion of the 2–3 shift-up action of the automatic transmission 14 by the shift-up action completion monitoring means 158 (step SA11), the pressure $P_{C2}$ is increased to the maximum value. Thus, the present control apparatus permits smooth releasing of the brake B1 and engagement of the clutch C2, assuring improved stability of the 2–3 shift-up action of the automatic transmission 14.

There will be described other embodiments of this invention, wherein the same reference numerals and characters as used in the first embodiment will be used to identify the functionally corresponding elements.

In a second embodiment of the invention, the learning compensation means 162 is adapted to execute a learning compensation sub-routine illustrated in the flow chart of FIG. 10. In this second embodiment, the learning compensation means 162 is adapted to update or adjust, by learning compensation, the pressure level $P_D$ to which the pressure $P_{B1}$ is rapidly reduced by the rapid pressure reduction means 132. The pressure level $P_D$ is updated as the control parameter influencing the pattern of change of the pressure $P_{B1}$ of the brake B1 which is released to achieve the 2–3 shift-up action of the automatic transmission 14. The pressure level $P_D$ is updated so that the rate of speed change $\Delta N_{B1}$ of a selected rotary member such as the hub of the brake B1 or the sun gear of the planetary gear device 42 coincides with a predetermined target value $\Delta N_{B1M}$. The rotary member may be any other rotary member of the automatic transmission 14 whose speed changes upon initiation of slipping of the brake B1.

The sub-routine of FIG. 10 is initiated with steps SS1 and SS2 described above with respect to the sub-routine of FIG. 8. If the affirmative decision (YES) is obtained in step SS2, the control flow goes to step SS3 to in which the presently effective pressure level $P_D$ is decremented by a predetermined decrement $\Delta P_D$ so that the actual rate of speed change $\Delta N_{B1}$ is reduced toward the target value $\Delta N_{B1M}$. If a negative decision (NO) is obtained in step SS2, the control flow goes to step SS4 in which the presently effective pressure level $P_D$ is incremented by a predetermined increment $\Delta P_D$ so that the actual rate of speed change $\Delta N_{B1}$ is increased toward the target value $\Delta N_{B1M}$. The thus updated pressure level $P_D$ is used in the next control cycle.

Figure 11:
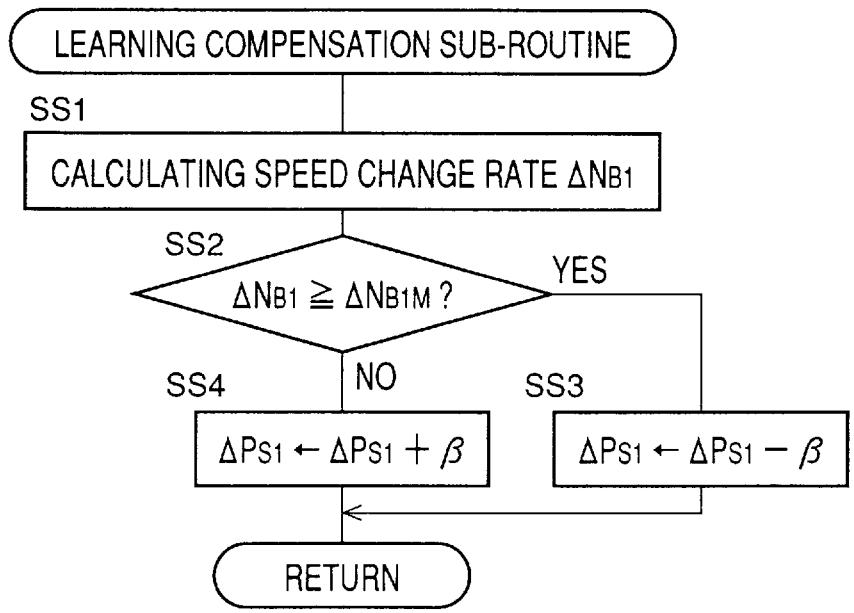
FIG. 11 is a flow chart illustrating a learning compensation sub-routine corresponding to that of FIG. 8, used in a third embodiment of this invention.

In a third embodiment of the invention, the learning compensation means 162 is adapted to execute a learning compensation sub-routine illustrated in the flow chart of FIG. 11. In this third embodiment, the learning compensation means 162 is adapted to update or adjust, by learning compensation, the pressure reduction rate $\Delta P_{S1}$ at which the pressure $P_{B1}$ is continuously reduced by the continuous pressure reduction means 136. The pressure reduction rate $\Delta P_{S1}$ is updated as the control parameter influencing the pattern of change of the pressure $P_{B1}$ of the brake B1 which is released to achieve the 2–3 shift-up action of the automatic transmission 14. The pressure reduction rate $\Delta P_{S1}$ is updated so that the rate of speed change $\Delta N_{B1}$ of the selected rotary member such as the hub of the brake B1 or the sun gear of the planetary gear device 42 coincides with the predetermined target value $\Delta N_{B1M}$.

The sub-routine of FIG. 11 is initiated with steps SS1 and SS2 described above with respect to the sub-routine of FIG. 8. If the affirmative decision (YES) is obtained in step SS2, the control flow goes to step SS3 to in which the presently effective pressure reduction rate $\Delta P_{S1}$ is decremented by a predetermined decrement $\beta$ so that the actual rate of speed change $\Delta N_{B1}$ is reduced toward the target value $\Delta N_{B1M}$. If a negative decision (NO) is obtained in step SS2, the control flow goes to step SS4 in which the presently effective pressure reduction rate $\Delta N_{B1}$ is incremented by a predetermined increment $\beta$ so that the actual rate of speed change $\Delta N_{B1}$ is increased toward the target value $\Delta N_{B1M}$. The thus updated pressure $\Delta N_{B1}$ is used in the next control cycle.

Figure 12:
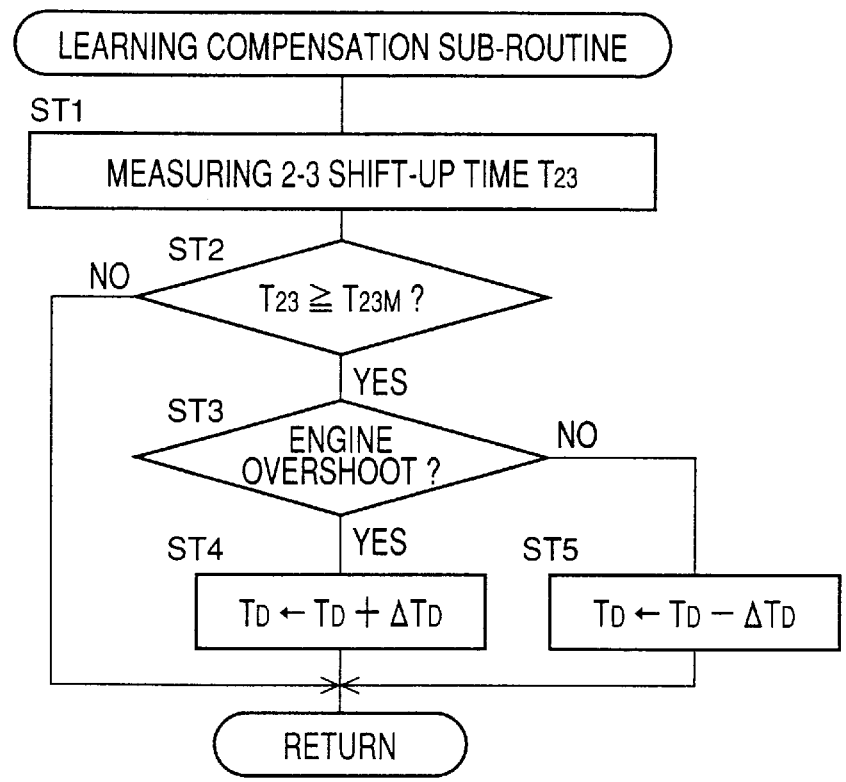
FIG. 12 is a flow chart illustrating a learning compensation sub-routine corresponding to that of FIG. 8, used in a fourth embodiment of this invention.
Figure 13:
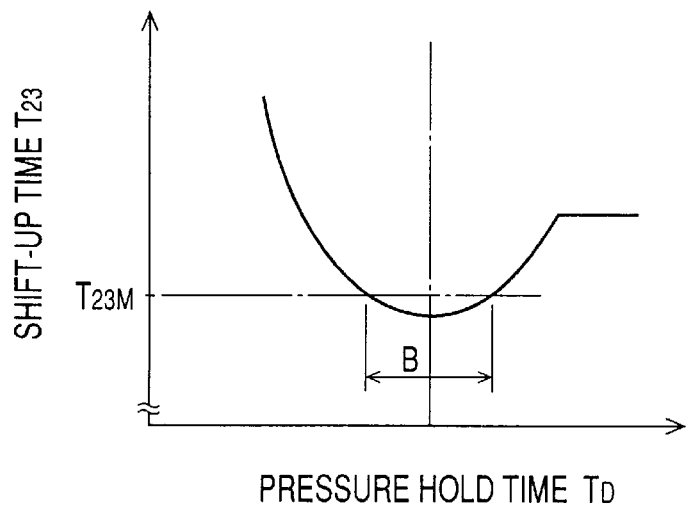
FIG. 13 is a view indicating a relationship between the pressure hold time $T_D$ updated by learning compensation in the sub-routine of FIG. 12 and a shift-up time $T_{23}$ of the automatic transmission.

In a fourth embodiment of the invention, the learning compensation means 162 is adapted to execute a learning compensation sub-routine illustrated in the flow chart of FIG. 12. In this fourth embodiment, the learning compensation means 162 is adapted to update or adjust, by learning compensation, the pressure hold time $T_D$ during which the pressure $P_{B1}$ is held at the pressure level $P_D$ by the releasing pressure hold means 134. The pressure hold time $T_D$ is updated as the control parameter influencing the pattern of change of the pressure $P_{B1}$ of the brake B1, so that the 2–3 shift-up time $T_{23}$ (i.e., the time during which the 2–3 shift-up action is effected) coincides with a predetermined target value $T_{23M}$. However, the control parameter to be updated in the sub-routine of FIG. 13 may be the pressure level $P_D$ as in the second embodiment of FIG. 10, or the pressure reduction rate $\Delta P_{S1}$ as in the third embodiment of FIG. 11.

The sub-routine of FIG. 12 is initiated with step ST1 to measure the 2–3 shift-up time $T_{23}$ by using a timer. For instance, the 2–3 shift-up time $T_{23}$ is a time from the moment at which the affirmative decision is obtained in step SA7 to the moment when the shift-up action completion monitoring means 158 determines that the 2–3 shift-up action is completed. Step ST1 is followed by step ST2 to determine whether the measured 2–3 shift-up action $T_{23}$ is equal to or longer than the predetermined target value $T_{23M}$. If a negative decision (NO) is obtained, one cycle of execution of the sub-routine of FIG. 12 is terminated. If an affirmative decision (YES) is obtained in step ST2, the control flow goes to step ST3 to determine whether the engine speed $N_E$ immediately after the initiation of the 2–3 shift-up action has an overshoot or not. If an affirmative decision (YES) is obtained in step ST3, it means that the pressure hold time $T_D$ is shorter than a lower limit of an optimum range B of the pressure hold time indicated in the graph of FIG. 13, whereby the 2–3 shift-up time $T_{23}$ is longer than the target value $T_{23M}$. In this case, the control flow goes to step ST4 in which the presently effective pressure hold time $T_D$ is incremented by a predetermined increment $\Delta T_D$ so that the actual 2–3 shift-up time $T_{23}$ is reduced toward the target value $T_{23M}$. If a negative decision (NO) is obtained in step ST3, it means that the pressure hold time $T_D$ is longer than an upper limit of the optimum range B of FIG. 13, whereby the 2–3 shift-up time $T_{23}$ is longer than the target value $T_{23M}$. In this case, the control flow goes to step ST5 in which the presently effective pressure hold time $T_D$ is decremented by a predetermined decrement $\Delta T_D$ so that the actual 2–3 shift-up time $T_{23}$ is reduced toward the target value $T_{23M}$. In the present embodiment, the continuous pressure reduction means 136 is adapted to initiate the continuous reduction of the pressure $P_{B1}$ when the pressure hold time $T_D$ reaches a predetermined upper threshold. Accordingly, the 2–3 shift-up time $T_{23}$ remains constant when the pressure hold time $T_D$ exceeds the above-indicated upper threshold.

Figure 14:
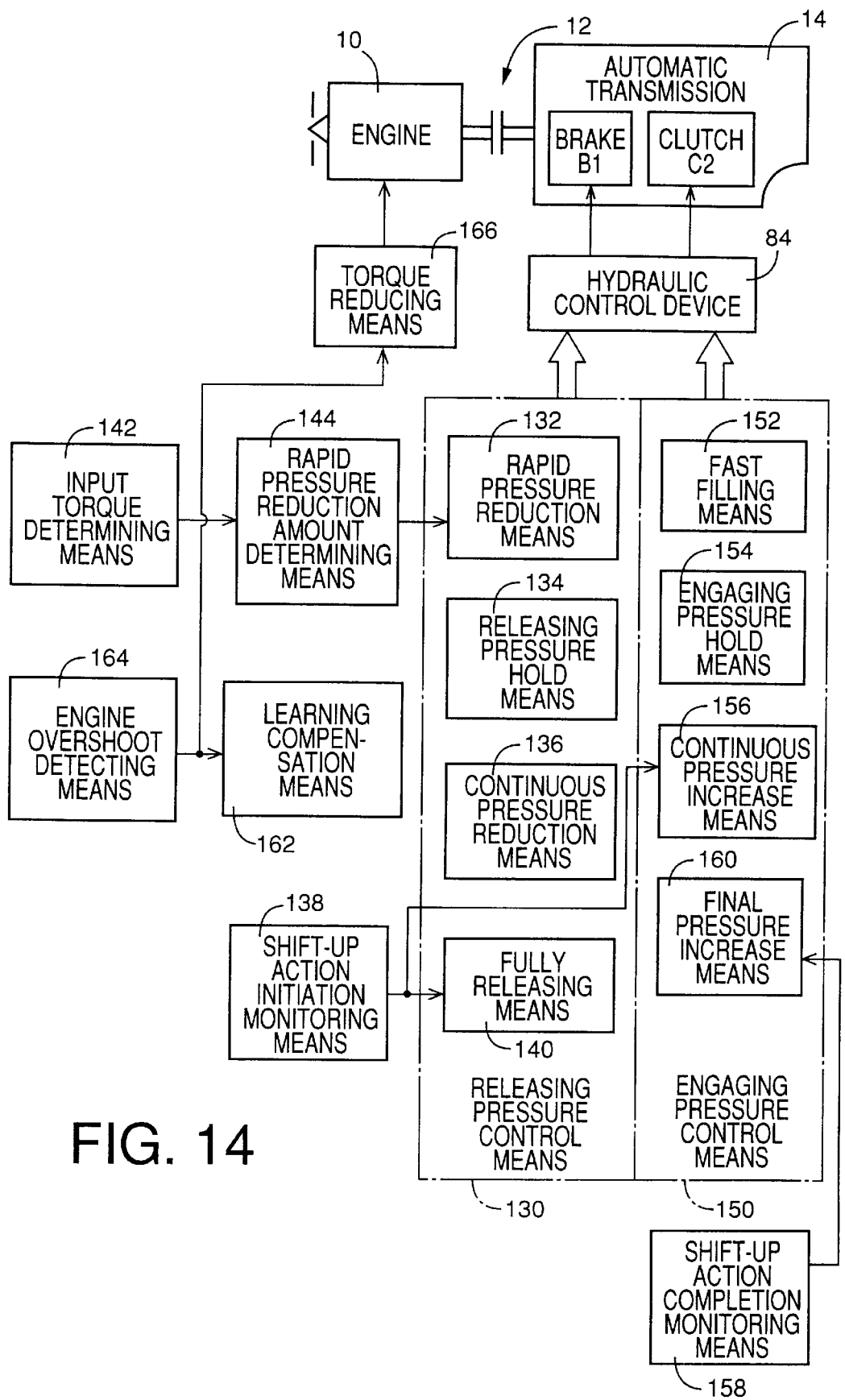
FIG. 14 is a block diagram corresponding to that of FIG. 5, illustrating various functional means of a transmission controller according to a fifth embodiment of this invention.
Figure 15:
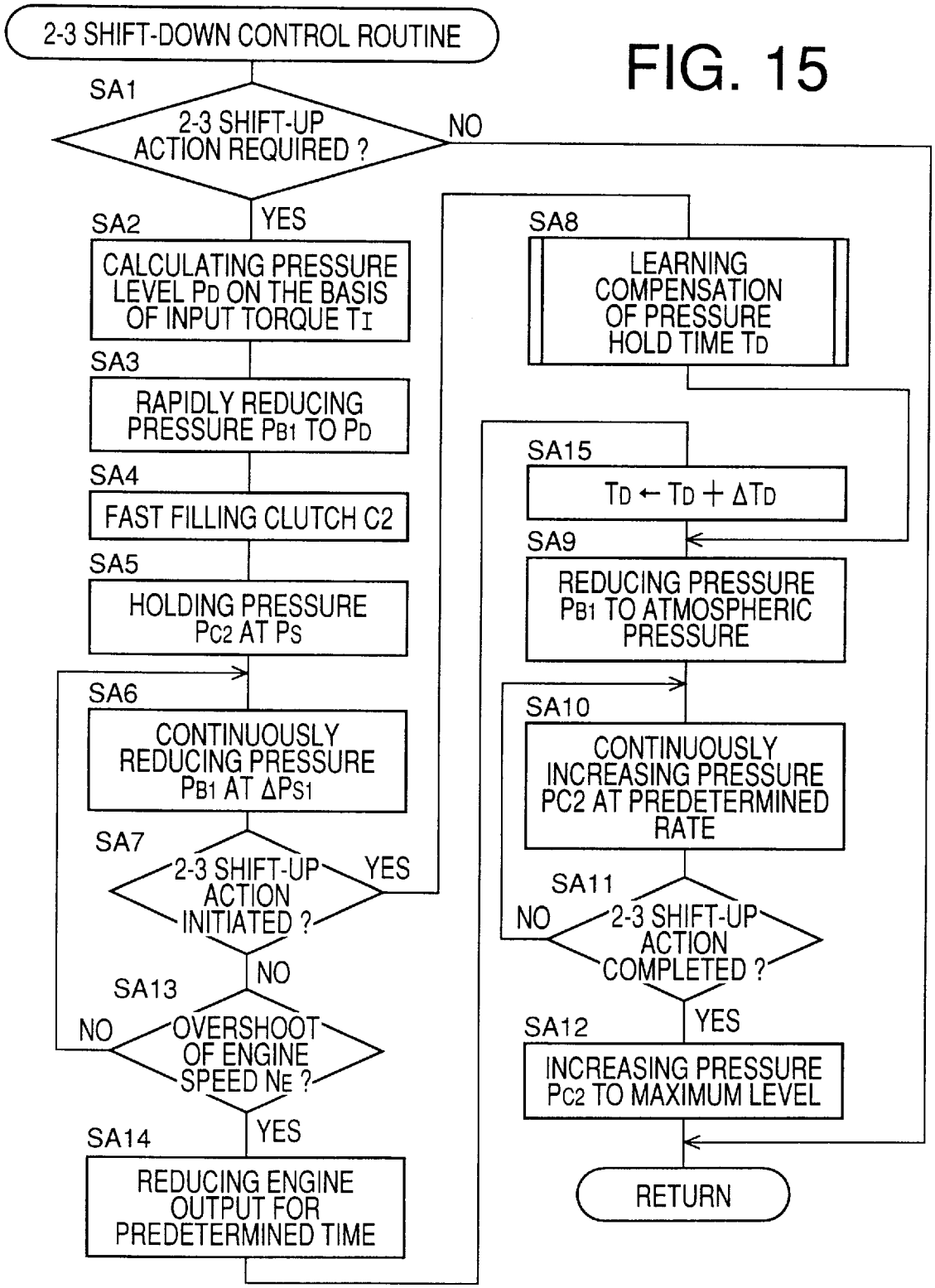
FIG. 15 is a flow chart corresponding to that of FIG. 7, illustrating an example of a 2–3 shift-up control routine executed by the transmission controller of FIG. 14.
Figure 16:
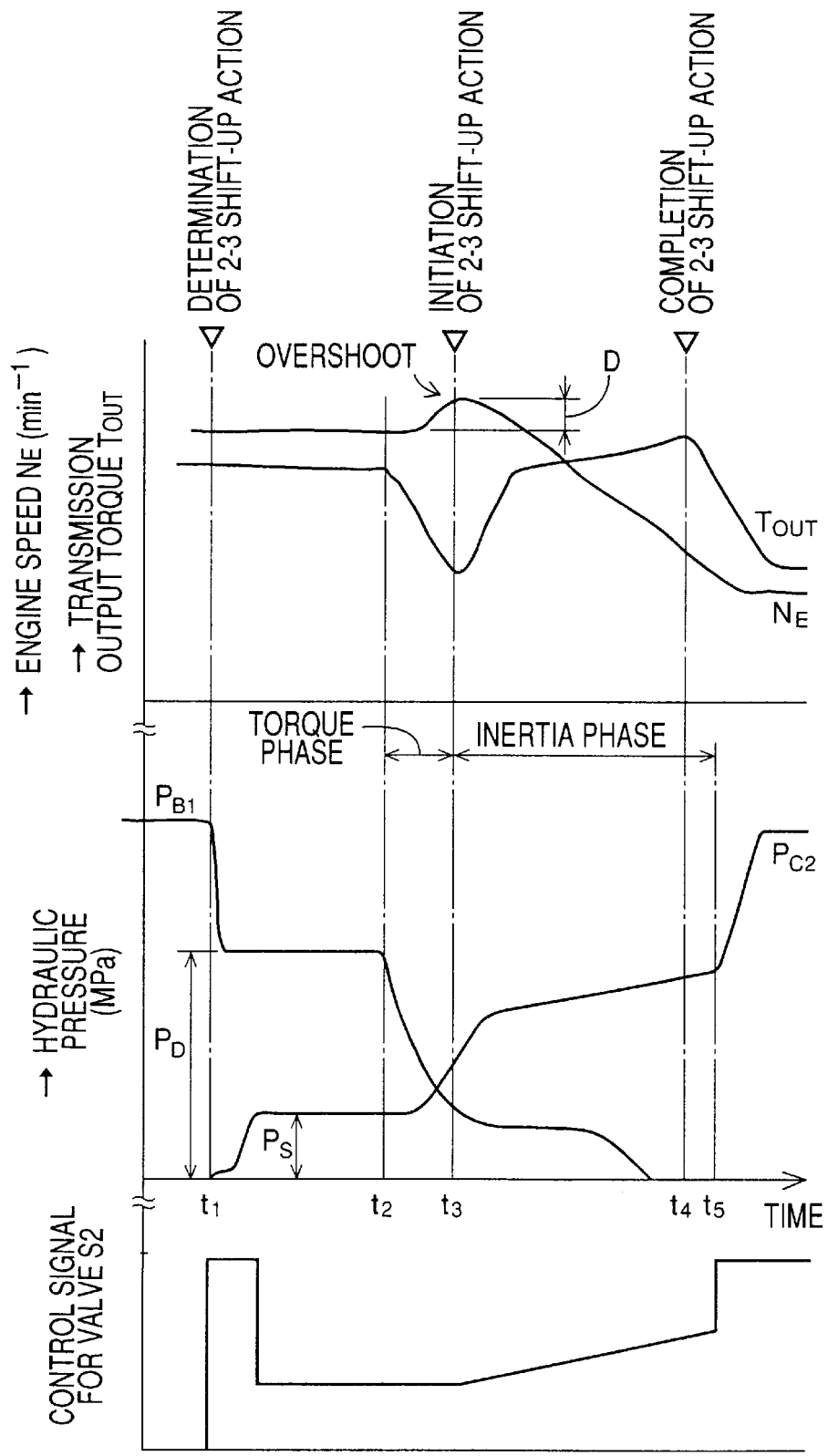
FIG. 16 is a time chart indicating changes of the engine speed $N_E$ (=$N_T$), transmission output torque $T_{OUT}$ and pressures $P_{B1}$, $P_{C2}$ of the brake B1 and clutch $C_2$ during the 2–3 shift-up action of the automatic transmission, when the pressures $P_{B1}$, $P_{C2}$ are controlled by the transmission controller in the fifth embodiment of FIGS. 14 and 15.

Referring next to FIGS. 14–16, there is shown a fifth embodiment of the present invention wherein the transmission controller 78 includes various functional means as illustrated in the block diagram of FIG. 14. The transmission controller 78 includes engine overshoot detecting means 164 and torque reducing means 166, in addition to the various means provided in the first through fourth embodiments of FIG. 5. The engine overshoot detecting means 164 is adapted to determine whether the speed $N_E$ of the engine 10 has an overshoot or abrupt rise due to an insufficient amount of simultaneous partial engagements of the brake B1 and clutch C2 in the process of the 2–3 shift-up action of the automatic transmission 14, which is the so-called "clutch-to-clutch shifting action" to be achieved by simultaneous releasing and engaging actions of the brake B1 and clutch C2 as described above. The engine overshoot detecting means 164 detects the occurrence of the engine speed overshoot if an amount D of abrupt rise of the engine speed $N_E$ is larger than a predetermined threshold. The torque reducing means 166 is adapted to temporarily reduce the output torque of the engine 10 if the overshoot of the engine speed $N_E$ is detected by the engine overshoot detecting means 164.

As in the preceding embodiments, the learning compensation means 162 in the present fifth embodiment is adapted to update the pressure hold time $T_D$ (at which the pressure $P_{B1}$ is held at the level $P_D$ by the releasing pressure hold means 134) such that the rate of speed change $\Delta N_{B1}$ coincides with the target value $\Delta N_{B1M}$. In the present fifth embodiment, the learning compensation means 162 is further adapted to update a selected control parameter influencing the pattern of change of the pressure $P_{B1}$ of the brake B1, such that the amount D of overshoot of the engine speed $N_E$ detected by the engine overshoot detecting means is held within a predetermined range. In a 2–3 shift-up control routine illustrated in the flow chart of FIG. 15, the pressure hold time $T_D$ is updated in step SA15 so that the amount D of the engine speed overshoot is held within the predetermined range, as described below. However, step SA15 may be formulated to update any other control parameters influencing the pattern of change of the pressure $P_{B1}$, such as: the pressure level $P_D$ to which the pressure $P_{B1}$ is rapidly reduced by the rapid pressure reduction means 132; the rate $\Delta P_{S1}$ at which the pressure $P_{B1}$ is continuously reduced by the continuous pressure reduction means 136; and the time duration during which the fast filling means 152 is operated to fill the clutch C2.

The 2–3 shift-up control routine of FIG. 15 is different from that of FIG. 7 in that steps SA13–SA15 are added in the routine of FIG. 15. More specifically described, step SA8 corresponding to the learning compensation means 162 is implemented as described above by reference to the flow chart of FIG. 8, if the affirmative decision (YES) is obtained in step SA7 as point "t" indicated in. FIG. 16. If the negative decision (NO) is obtained in step SA7, the control flow goes to step SA13 corresponding to the engine overshoot detecting means 164, to determine whether the amount of overshoot D of the engine speed $N_E$ is larger than the predetermined threshold. If a negative decision (NO) is obtained in step SA13, the control flow goes back to step SA6, so that the pressure $P_{B1}$ is continuously reduced until the affirmative decision (YES) is obtained in step SA7 or SA13.

When the affirmative decision (YES) is obtained in step SA13 before substantial initiation of the 2–3 shift-up action, the control flow goes to step SA14 corresponding to the torque reducing means 166, to temporarily reduce the output torque of the engine 10, for eliminating the overshoot of the engine speed $N_E$. The output torque of the engine 10 can be reduced by temporarily retarding the spark advance of the engine 10 or temporarily reducing the amount of fuel injection into the engine 10. Step SA14 is followed by step SA15 also corresponding to the learning compensation means 162, in which the pressure hold time $T_D$ is incremented by the predetermined increment $\Delta T_D$. In this respect an increase in the pressure hold time $T_D$ results in retarding the reduction of the torque to be transmitted through the partially engaged brake B1. When the thus updated pressure hold time $T_D$ is used in the next control cycle, the amount of simultaneous partial engagements of the brake B1 and the clutch C2 is increased by an amount corresponding to the increment $\Delta T_D$ whereby the engine speed overshoot is reduced. Steps SA8 and SA15 are followed by steps SA9–SA12 described above.

In the present fifth embodiment, the learning compensation means 162 (step SA15) is adapted to update the pressure hold time $T_D$ (which influences the patter of change of the pressure $P_{B1}$ of the brake B1) such that the amount of overshoot of the engine speed $N_E$ detected by the engine overshoot detecting means 164 (SA13) is held within the predetermined range. The present learning compensation of the pressure hold time $T_D$ is effective to permit the pressures $P_{B1}$ and $P_{C2}$ to be controlled in the desired pattern during the 2–3 shift-up action, irrespective of the chronological change in the operating characteristics of the brake B1 and clutch C2, and the temperature variation of the working fluid used for operating the brake B1 and clutch C2. Accordingly, the present control apparatus assures sufficient stability or smoothness of the 2–3 shift-up action of the automatic transmission 14, without a considerable shifting shock or a considerable overshoot of the engine speed $N_E$.

Further, the torque reducing means 166 (step SA14) is adapted to temporarily reduce the output torque of the engine 10 upon detection of the engine speed overshoot by the engine overshoot detecting means 164. This arrangement is effective to prevent an excessive racing of the engine 10 during the 2–3 shift-up action of the automatic transmission 14 immediately after the manufacture of the vehicle or the replacement of a battery.

Figure 17:
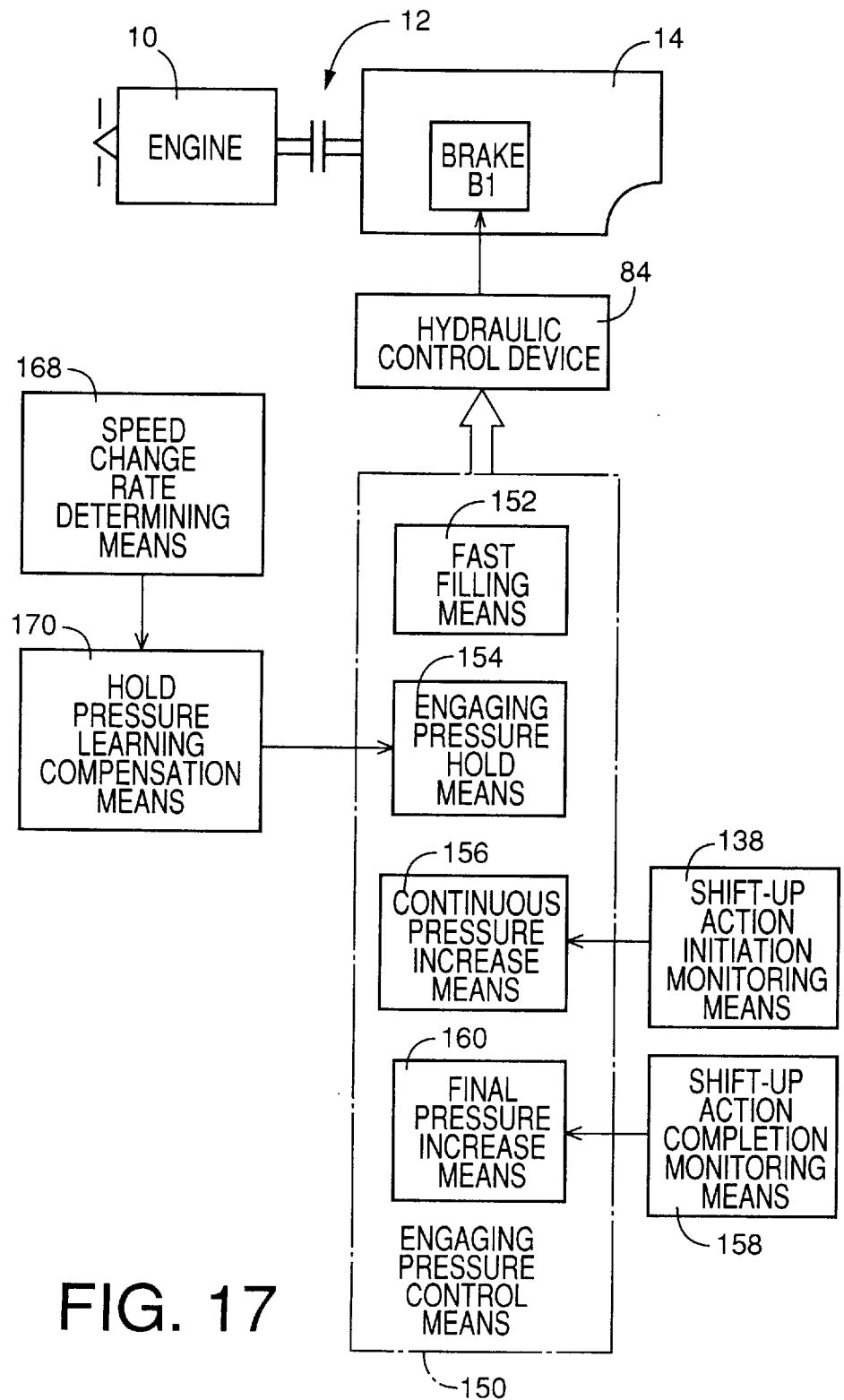
FIG. 17 is a block diagram corresponding to that of FIG. 5, illustrating various functional means of a transmission controller according to a sixth embodiment of this invention.

Referring to FIGS. 17–21, there will be described a sixth embodiment of this invention, wherein the transmission controller 78 includes the engaging pressure control means 150, speed change rate determining means 168 and hold pressure learning compensation means 170, as shown in the block diagram of FIG. 17. In this embodiment, the engaging pressure control means 150 is adapted to control the pressure $P_{B1}$ of the brake B1 during a 1–2 shift-up action of the automatic transmission 14. In the 1–2 shift-up action, the brake B1 is engaged, and the pressure $P_{B1}$ is controlled by the engaging pressure control means 150, in the same manner as the pressure $P_{C2}$ of the clutch C2 during the 2–3 shift-up action in which the clutch C2 is engaged. The speed change rate determining means 168 is adapted to determine the of speed change rate $\Delta N_{B1}$ of a selected rotary member of the automatic transmission 14 whose speed changes upon initiation of slipping of the brake B1. For instance, the hub of the brake B1 or the sun gear of the planetary gear device 42 is selected as this rotary member whose speed change rate $\Delta N_{B1}$ is determined by the speed change rate determining means 168. The hold pressure learning compensation means 170 is adapted to update the pressure hold level $P_S$ at which the pressure $P_{B1}$ is held during the 1–2 shift-up action, so that the speed change rate $\Delta N_{B1}$ coincides with a predetermined value $\Delta N_{B1M}$.

Figure 18:
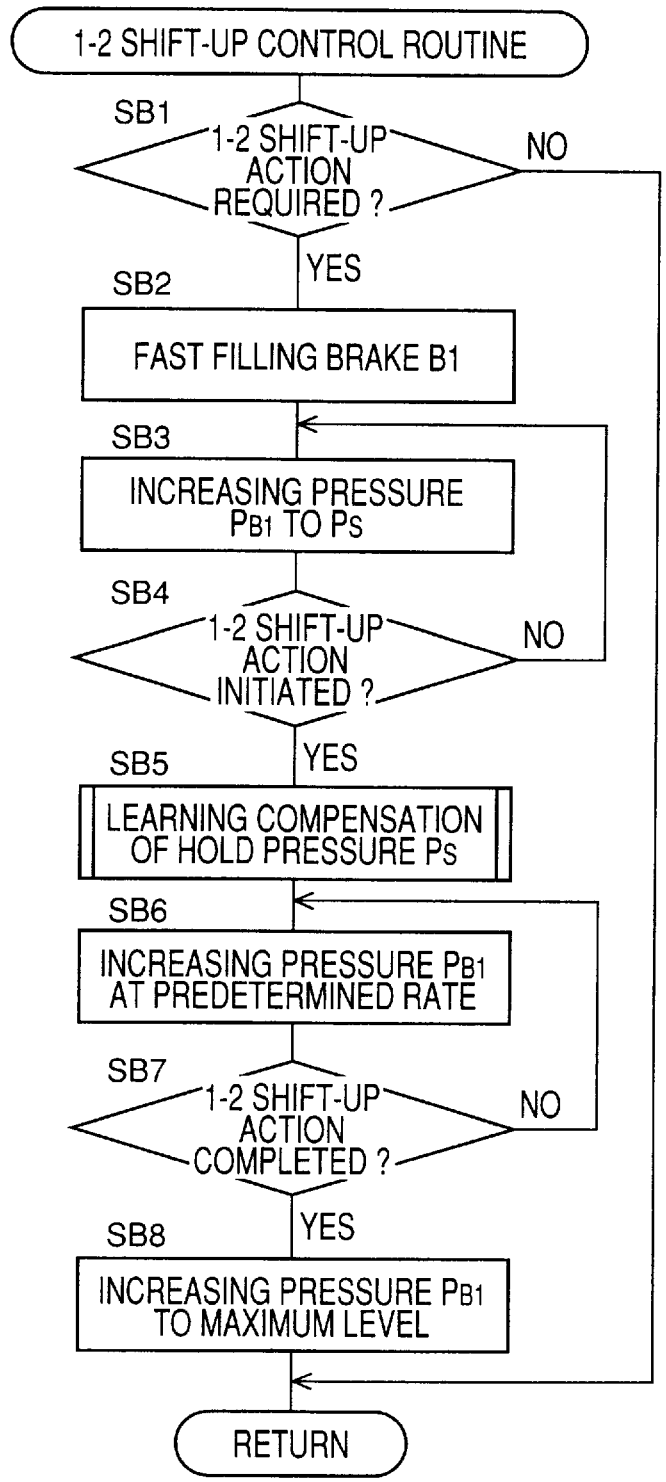
FIG. 18 is a flow chart illustrating a 1–2 shift-up control routine executed by the transmission controller of FIG. 17.

The transmission controller 78 is adapted to execute a 1–2 shift-up control routine illustrated in the flow chart of FIG. 18. This routine is initiated with step SB1 to determine whether the automatic transmission 14 should be shifted up from the first-speed position "1st" to the second-speed position "2nd". This determination is effected by determining whether a point defined by the detected throttle opening angle θ and running speed V of the vehicle has moved across a stored predetermined 1–2 shift-up boundary line which is a relationship between the throttle opening angle θ and running speed V. Alternatively, the determination in step SB1 is effected by determining whether the shift lever 72 is operated from the LOW position "L" to the SECOND position "2" or DRIVE position "D". If a negative decision (NO) is obtained in step SB1, one cycle of execution of the routine of FIG. 18 is terminated. If an affirmative decision (YES) is obtained in step SB1, the control flow goes to step SB2 corresponding to the fast filling means 152, wherein the maximum drive signal is applied to the solenoid-operated valve S1 (FIG. 4) for the predetermined short time so that the brake B1 is rapidly filled with the working fluid, during a period T1–t2 indicated in the time chart of FIG. 19. The drive signal corresponds to the maximum value of the pressure $P_{B1}$.

Then, the control flow goes to step SB3 corresponding to the engaging pressure hold means 154, to increase the pressure $P_{B1}$ to a predetermined pressure hold level $P_S$ and hold it at this level $P_S$. At this time, the drive signal applied to the valve S1 corresponds to the pressure hold level $P_S$. In this embodimentr step SB2 and SB3 are considered to correspond to pressure increasing means for increasing the pressure $P_{B1}$ to a predetermined level upon determination of the 1–2 shift-up action.

Step SB3 is followed by step SB4 corresponding to the shift-up action initiation monitoring means 138, to determine whether the 1–2 shift-up action of the automatic transmission 14 has been substantially initiated. This determination is effected by determining whether the speed $N_E$ of the engine 10 begins to decrease. If a negative decision (NO) is obtained in step SB4, the control flow goes back to step SB3. The pressure $P_{B1}$ is held at the level $P_S$, with step SB3 being repeatedly implemented until an affirmative decision (YES) is obtained in step SB4. That is, the pressure $P_{B1}$ is held at the level $P_S$ for a period t2–t3 indicated in FIG. 19.

Figure 20:
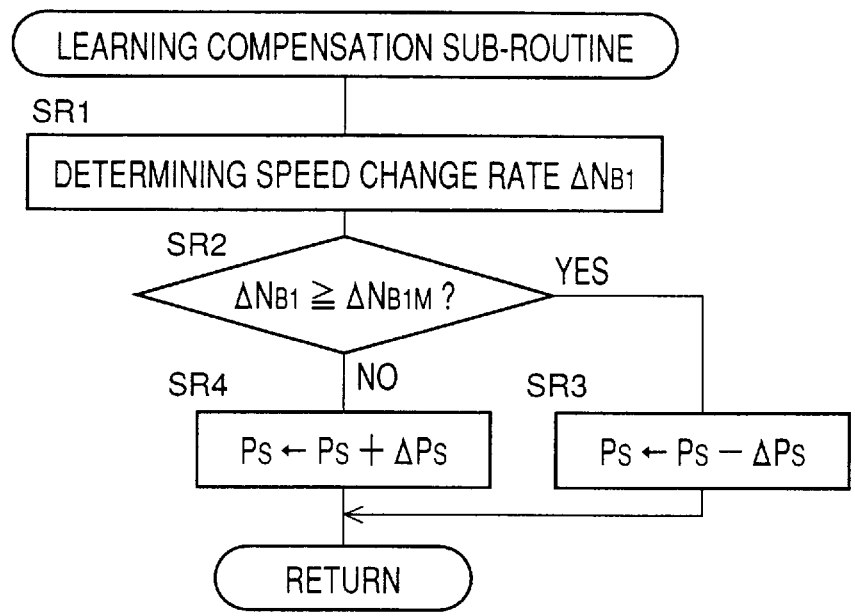
FIG. 20 is a flow chart illustrating a learning compensation sub-routine executed in step SB5 of the routine of FIG. 18.

When the affirmative decision (YES) is obtained in step SB4, the control flow goes to step SB5 corresponding to the hold pressure learning compensation means 170, to execute a learning compensation sub-routine illustrated in the flow chart of FIG. 20, in which the pressure hold level $P_S$ at which the pressure $P_{B1}$ is held by the engaging pressure hold means 154.

The learning compensation sub-routine of FIG. 20 is initiated with step SR1 to calculate the rate of speed change $\Delta N_{B1}$ of the selected rotary member of the automatic transmission 14, on the basis of the output signal of an appropriate speed sensor. The speed of this rotary member changes upon initiation of slipping of the brake B1. For instance, the rotary member may be the hub of the brake B1 or the sun gear of the planetary gear device 42. Then, the control flow goes to step SR2 to determine whether the calculated rate of speed change $\Delta N_{B1}$ is equal to or higher than the predetermined target value $\Delta N_{B1M}$. If an affirmative decision (YES) is obtained in step SR2, the control flow goes to step SR3 in which the presently effective pressure hold level $P_S$ is decremented by a predetermined decrement $\Delta P_S$ so that the actual rate of speed change $\Delta N_{B1}$ is reduced toward the target value $\Delta N_{B1M}$. If a negative decision (NO) is obtained in step SR2, the control flow goes to step SR4 in which the presently effective pressure hold level $P_S$ is incremented by a predetermined increment $\Delta P_S$ so that the actual rate of speed change $\Delta N_{B1}$ is increased toward the target value $\Delta N_{B1M}$. The thus updated pressure hold level $P_S$ is used in the next control cycle for holding the pressure $P_{B1}$ at the level $P_S$ in step SB3.

Figure 21:
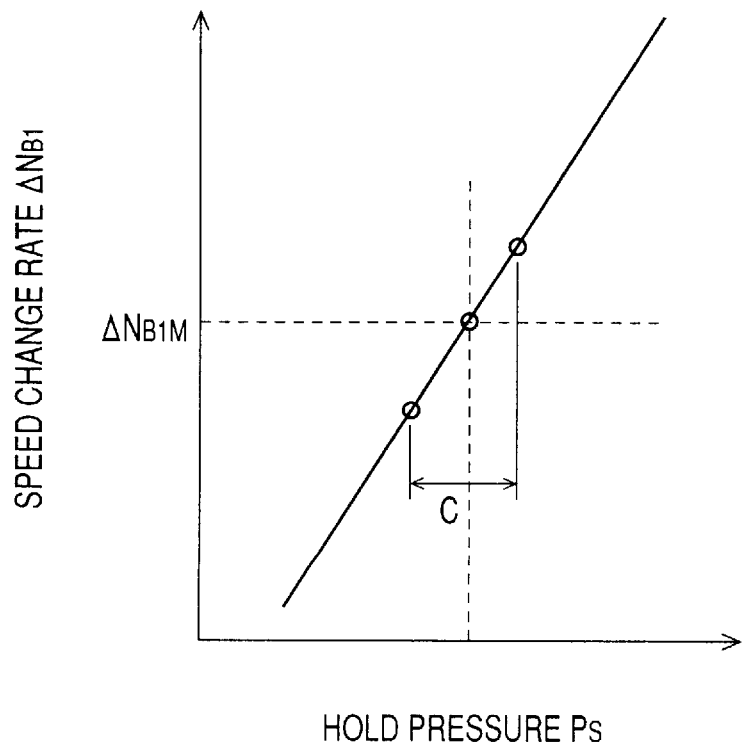
FIG. 21 is a view indicating a relationship between a hold pressure $P_S$ updated in the sub-routine of FIG. 20 and the rate of change $\Delta N_{B1}$ of the speed of the brake B1.

Between the rate of change $\Delta N_{B1}$ of the speed of the selected rotary member and the pressure hold level $P_S$, there exists a relationship as indicated in the graph of FIG. 21. The pressure hold level $P_S$ is updated in the learning compensation sub-routine of FIG. 21 so that the rate of speed change $\Delta N_{B1}$ falls within an optimum range C indicated in FIG. 21 by way of example, whereby the rate of speed change $\Delta N_{B1}$ is held almost constant so as to permit the 1–2 shift-up action to be performed in the desired manner. With the pressure level $P_S$ held within the optimum range C, the shifting shock of the automatic transmission 13 during the 1–2 shift-up action is considerably reduced.

Figure 19:
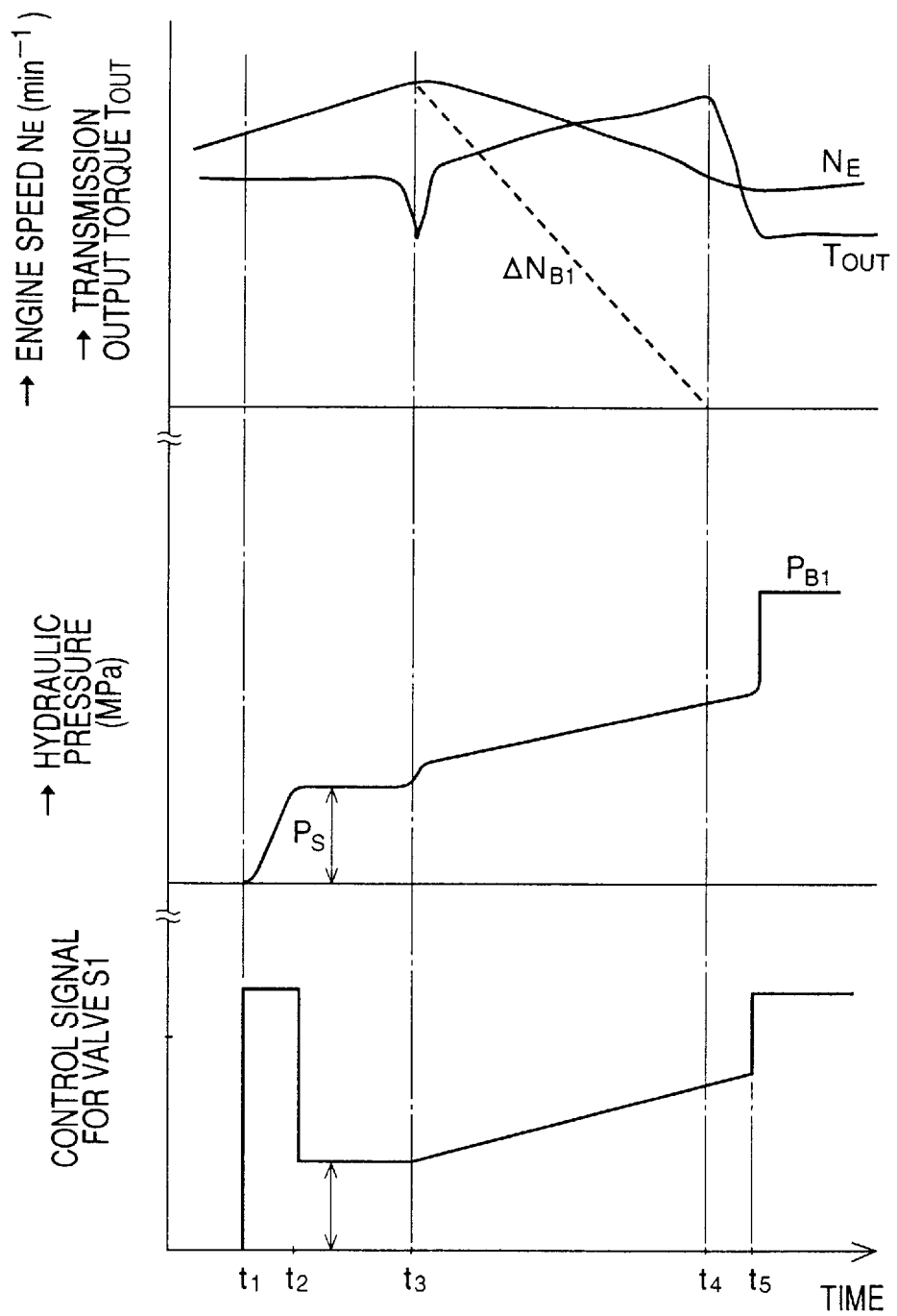
FIG. 19 is a time chart indicating changes of the engine speed $N_E$ (=$N_T$), transmission output torque $T_{OUT}$ and pressure $P_{B1}$ of the brake B1 during a 1–2 shift-up action of the automatic transmission, when the pressure $P_{B1}$ is controlled by the transmission controller in the sixth embodiment of FIGS. 17 and 18.

Referring back to the routine of FIG. 18, step SB5 (sub-routine of FIG. 20) is followed by step SB6 corresponding to the continuous pressure increase means 156, in which the pressure $P_{B1}$ of the brake B1 is continuously increased from the level $P_S$ as indicated at point "t3" in FIG. 19.

Step SB6 is followed by step SB7 corresponding to the shift-up action completion monitoring means 158, to determine whether the 1–2 shift-up action is completed. The determination in step SB7 is effected by determining whether the input speed $N_T$ of the automatic transmission 14 has become equal to the output speed $N_{OUT}$ multiplied by the speed ratio ρ2ND of the second-speed position "2nd" of the automatic transmission 14. If a negative decision (NO) is obtained in step SB7, the control flow goes back to step SB6. The continuous increase of the pressure $P_{B1}$ is continued with step SB6 being repeatedly implemented, until an affirmative decision (YES) is obtained in step SB7, that is, during the period t3–t4 indicated in FIG. 19.

When the affirmative decision (YES) is obtained in step SB7 at point "t4" indicated in FIG. 19, the control flow goes to step SB8 corresponding to the final pressure increase means 160, to increase the pressure $P_{B1}$ toward its maximum value, a given time after the determination of completion of the 1–2 shift-up action, as indicated at point "t5" in FIG. 19.

In the present control apparatus according to the sixth embodiment of the invention, the hold pressure learning compensation means 170 (step SB5; steps SR2–SR4) is provided to update or adjust the pressure hold level $P_S$ so that the pressure $P_{B1}$ of the brake B1 is changed in the desired pattern during the 1–2 shift-up action wherein the brake B1 is engaged. The learning compensation of the pressure level $P_S$ which influences the pattern of change of the pressure $P_{B1}$ is effective to permit the pressure $P_{B1}$ to be controlled in the desired pattern, irrespective of the chronological change in the operating characteristic of the brake B1 and the temperature variation of the working fluid supplied to the brake B1. Accordingly, the present control apparatus assures sufficient stability or smoothness of the 1–2 shift-up action of the automatic transmission 14, without a considerable shifting shock.

While the several presently preferred embodiments of this invention have been described in detail by reference to the accompanying drawings, the invention may be otherwise embodied.

For instance, the transmission controller 78 may be adapted to execute both the 2–3 shift-up control routine of FIG. 7 or 15 and the 1–2 shift-up control routine of FIG. 18. Step SA8 in the fifth embodiment of FIG. 15 may be modified to execute the learning compensation sub-routine illustrated in the flow chart of FIG. 10, 11 or 12.

The first through fifth embodiments of FIGS. 7, 10, 11, 12 and 15 are adapted to control the 2–3 shift-up action while the sixth embodiment of FIG. 18 is adapted to control the 1–2 shift-up action. Where the automatic transmission 14 has five or more forward-drive positions, however, the principle of the present invention is equally applicable to the other shift-up actions which are achieved by simultaneous engaging and releasing actions of two hydraulically operated frictional coupling devices or by an engaging action of a hydraulically operated frictional coupling device.

The routines of FIGS. 7, 15 18 may be executed only when the 2–3 shift-up action or 1–2 shift-up action is effected during acceleration of the motor vehicle with the drive force being transmitted from the engine 10 to the drive wheels. In other words, step SA1 or SB1 may be modified to determine whether the ACCELERATOR-ON 2–3 or 1–2 shift-up action should be achieved with the accelerator pedal 50 placed in a depressed state.

While the embodiments of FIGS. 7 and 15 are arranged such that the releasing pressure control hold means 134 holds the pressure $P_{B1}$ at the predetermined level $P_D$ for the predetermined hold time $T_D$, the pressure $P_{B1}$ may be reduced at a comparatively low rate during a period corresponding to the hold time $T_D$.

The embodiments of FIGS. 7 and 15 may include learning compensation inhibiting means for inhibiting an operation of the learning compensation means 162 when slipping of a wheel of the motor vehicle is detected during the 2–3 shift-up action of the automatic transmission 14.

The embodiment of FIG. 15 may include learning compensation inhibiting means for inhibiting an operation of the learning compensation means 162 while permitting an operation of the torque reducing means 166, if an apparent overshoot of the engine 10 is detected due to slipping of a vehicle wheel during the 2–3 shift-up action.

It is to be understood that the present invention may be embodied with various other changes, modifications and improvements, which may occur to those skilled in the art, without departing from the spirit and scope of the invention defined in the following claims:

What is claimed is:

1. An apparatus for controlling an automatic transmission of a motor vehicle, wherein a shifting action of the automatic transmission is achieved by engaging a hydraulically operated frictional coupling device, said apparatus comprising:

pressure increasing means for increasing a pressure of said frictional coupling device to a pressure hold level, upon determination that said shifting action of the automatic transmission should be achieved;

pressure hold means for holding the pressure of said frictional coupling device at said pressure hold level for a predetermined time;

continuous pressure increase means for continuously increasing the pressure of said frictional coupling device upon expiration of said predetermined hold time; and hold pressure learning compensation means for updating, by learning compensation, said pressure hold level such that said shifting action is achieved in a predetermined manner.

2. An apparatus according to claim 1, wherein said shifting action of the automatic transmission is a shift-up action during acceleration of the motor vehicle wherein a drive force is transmitted in a direction from an engine to a drive wheel of the motor vehicle.

3. An apparatus according to claim 2, wherein said pressure increasing means comprises fast filling means for effecting fast filling of said frictional coupling device with a working fluid, and said pressure hold means is operated after said fast filling, to increase the pressure of said frictional coupling device to said pressure hold level and hold the pressure at said pressure hold level.

4. An apparatus according to claim 3, further comprising:

shift-up action initiation monitoring means for determining whether said shift-up action of the automatic transmission has been substantially initiated; and continuous pressure increase means for continuously increasing the pressure of said frictional coupling device from said pressure hold level at a predetermined rate, when said shift-up action initiation monitoring means determines that said shift-up action has been substantially initiated.

5. An apparatus according to claim 4, further comprising:

shift-up action completion monitoring means for determining whether said shift-up action of the automatic transmission is completed; and final pressure increase means for increasing the pressure of said frictional coupling device to a maximum value thereof when said shift-up action completion monitoring means determines that said shift-up action is completed.

6. An apparatus according to claim 1 further comprising speed change rate determining means for determining a rate of change of a speed of a rotary member of the automatic transmission, said speed of said rotary member changing due to engagement of said frictional coupling device, and wherein said hold pressure learning compensation means updates said pressure hold level such that said rate of change of the speed of said rotary member which is determined by said speed change rate determining means coincides with a predetermined target value.

* * * * *